US012550157B2

(12) United States Patent
Maleki et al.

(10) Patent No.: US 12,550,157 B2
(45) Date of Patent: Feb. 10, 2026

(54) REDUCING POWER CONSUMPTION FOR PDCCH MONITORING

(71) Applicant: Telefonaktiebolaget LM Ericsson (publ), Stockholm (SE)

(72) Inventors: Sina Maleki, Malmö (SE); Ilmiawan Shubhi, Malmö (SE); Andres Reial, Höllviken (SE); Ali Nader, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 400 days.

(21) Appl. No.: 18/018,609

(22) PCT Filed: Jul. 21, 2021

(86) PCT No.: PCT/EP2021/070343
§ 371 (c)(1),
(2) Date: Jan. 30, 2023

(87) PCT Pub. No.: WO2022/023138
PCT Pub. Date: Feb. 3, 2022

(65) Prior Publication Data
US 2023/0309108 A1    Sep. 28, 2023

Related U.S. Application Data

(60) Provisional application No. 63/057,448, filed on Jul. 28, 2020.

(51) Int. Cl.
*H04W 72/231* (2023.01)
*H04L 1/1812* (2023.01)
*H04W 72/1263* (2023.01)

(52) U.S. Cl.
CPC ......... *H04W 72/231* (2023.01); *H04L 1/1812* (2013.01); *H04W 72/1263* (2013.01)

(58) Field of Classification Search
CPC ........... H04W 72/231; H04W 72/1263; H04W 52/0235; H04L 1/1812; H04L 5/0053; H04L 5/0078; H04L 5/0094; Y02D 30/70
(Continued)

(56) References Cited

U.S. PATENT DOCUMENTS

2018/0084551 A1* 3/2018 Shin ................ H04L 5/0092
2020/0092814 A1* 3/2020 Zhou ............... H04W 52/0235
(Continued)

FOREIGN PATENT DOCUMENTS

| CN | 111278096 A * | 6/2020 | ........ H04W 52/0248 |
| WO | 2021109501 A1 | 6/2021 | |
| WO | WO 2021/148040 A1 | 7/2021 | |

OTHER PUBLICATIONS

International Search Report and Written Opinion of the International Searching Authority, PCT/EP2021/070343, mailed Nov. 5, 2021, 10 pages.
(Continued)

Primary Examiner — Candal Elpenord
(74) Attorney, Agent, or Firm — Sage Patent Group

(57) ABSTRACT

Techniques are provided for skipping or suspending PDCCH monitoring to reduce power consumption in a wireless device and extend battery lifetime. To implement PDCCH skipping, the access node sends a command to the wireless device to suspend PDCCH monitoring for a specified time period following a delay period. The request to suspend PDCCH monitoring, referred to herein as the PDCCH monitoring indication, is sent in DCI. In some embodiments, the length of the delay period and/or the suspension interval can be preconfigured. In other embodiments, the length of the delay period and/or the suspension interval is indicated by the DCI transmitted to the wireless device. In response to the PDCCH monitoring indication, the wireless device suspends PDCCH monitoring for a period spanning one or
(Continued)

more PDCCH monitoring occasions following the end of the delay period and remains in a sleep mode or low power mode.

19 Claims, 18 Drawing Sheets

(58) Field of Classification Search
USPC .................................................. 370/329–330
See application file for complete search history.

(56) References Cited

U.S. PATENT DOCUMENTS

| | | | |
|---|---|---|---|
| 2020/0229092 A1 | 7/2020 | Wu et al. | |
| 2021/0321276 A1* | 10/2021 | Kim | H04W 72/53 |
| 2022/0086659 A1* | 3/2022 | Wang | H04W 52/0235 |
| 2022/0140943 A1* | 5/2022 | Zhang | H04W 72/0446 370/329 |
| 2022/0346018 A1* | 10/2022 | Tsai | H04W 52/0235 |
| 2023/0146873 A1* | 5/2023 | Zhao | H04W 24/08 370/329 |
| 2023/0171626 A1* | 6/2023 | Seo | H04L 5/0053 370/329 |
| 2023/0179387 A1* | 6/2023 | Papasakellariou | H04W 72/0446 370/329 |
| 2023/0319720 A1* | 10/2023 | Awoniyi-Oteri | H04W 76/28 370/318 |

OTHER PUBLICATIONS

"Discussion on PDCCH Monitoring Skipping and PDCCH Monitoring Periodicity Switch," 3GPP TSG RAN WG1 #97, R1-1906172, Reno, NV, USA, May 13-17, 2019, VIVO, Agenda Item 7.2.9.3, (XP051727626) 4 pages.
"DCI-Based Mechanism in Skipping PDCCH Monitoring and Switching PDCCH Monitoring Periodicity," 3GPP TSG RAN WG2 #106, R2-1905956, Reno, NV, USA, May 13-17, 2019, VIVO, Agenda Item 11.11.4.2, (XP051705082) 5 pages.
Office Action, Japanese Patent Application No. 2023-506096, mailed Jan. 9, 2024, 13 pages.
"Considerations on PDCCH-based Power Saving Signal," 3GPP TSG-RAN WG1 #97, R1-1906819, Reno, NV, USA, May 13-17, 2019, Intel Corporation, Agenda Item 7.2.9.1, 12 pages.
"Other Considerations on UE Power Saving," 3GPP TSG RAN WG1 Meeting #99, R1-1911874, Reno, NV, USA, Nov. 18-22, 2019, Huawei, HiSilicon, Agenda Item 7.2.9.4, 10 pages.
"Views on Power Saving Enhancement," 3GPP TSG RAN WG1 #101, e-Meeting, May 25-Jun. 5, 2020, ZTE, Agenda Item 7.2.7.4, 13 pages.
"Further Discussions on the Impact of DCI-Based PDCCH Skipping," 3GPP TSG-RAN2 Meeting #106, R2-1906904, Reno, NV, USA, May 13-17, 2019, Huawei, HiSilicon, Aenda Item 11.11.4.2, 10 pages.

* cited by examiner

REDUCING POWER CONSUMPTION FOR PDCCH MONITORING

CROSS REFERENCE TO RELATED APPLICATIONS

This application is a 35 U.S.C. § 371 national stage application of PCT International Application No. PCT/EP2021/070343 filed on Jul. 21, 2021, which in turn claims domestic priority to U.S. Provisional Patent Application No. 63/057,448, filed on Jul. 28, 2020, the disclosures and content of which are incorporated by reference herein in their entirety.

TECHNICAL FIELD

The present disclosure relates generally to control channel monitoring in a wireless communication network and, more particularly to techniques to reduce power consumption associated with control channel monitoring.

BACKGROUND

The New Radio (NR) standard under development by the Third Generation Partnership Project (3GPP) is being designed to provide service for multiple use cases, such as Enhanced Mobile Broadband (eMBB), Ultra-Reliable and Low Latency Communication (URLLC), and Machine-Type Communication (MTC). Each of these services has different technical requirements. For example, the general requirement for eMBB is high data rate with moderate latency and moderate coverage, while URLLC service requires low latency and high reliability transmission with moderate data rates.

One of the solutions for providing low latency data transmission is shorter transmission time intervals. In NR, in addition to transmission in a slot, a mini-slot transmission is also allowed to reduce latency. A mini-slot may consist of any number of 1 to 14 Orthogonal Frequency Division Multiplexing (OFDM) symbols. It should be noted that the concepts of slot and mini-slot are not specific to a service meaning that a mini-slot may be used for either eMBB, URLLC, or other services.

Power consumption of a wireless device, also known as a user equipment (UE), is an important design consideration for NR systems. A wireless device can expend significant power monitoring the Physical Downlink Control Channel (PDCCH) to determine whether a downlink (DL) transmission for the wireless device is scheduled. The wireless device needs to perform blind detection in its configured Control Resource Sets (CORESETs) to identify whether the downlink control information (DCI) transmitted on the PDCCH is addressed to the wireless device, and act accordingly. PDCCH monitoring in active time is one of the most power-consuming processing categories in a wireless device. In fact, monitoring for PDCCH in the absence of data is one of the dominant sources of energy consumption in typical scenarios. Techniques that to reduce PDCCH monitoring time intervals (to allow more deep sleep) and instantaneous monitoring durations (e.g., for more micro-sleep) can be beneficial from a power consumption perspective.

SUMMARY

The present disclosure relates generally to techniques for skipping or suspending PDCCH monitoring to reduce power consumption in a wireless device and extend battery lifetime. To implement PDCCH skipping, the access node sends a command to the wireless device to suspend PDCCH monitoring for a specified time period following a delay period. The request to suspend PDCCH monitoring, referred to herein as the PDCCH monitoring indication, is sent in DCI. In some embodiments, the length of the delay period and/or the suspension interval can be preconfigured. In other embodiments, the length of the delay period and/or the suspension interval is indicated by the DCI transmitted to the wireless device. In response to the PDCCH monitoring indication, the wireless device suspends PDCCH monitoring for a period spanning one or more PDCCH monitoring occasions following the end of the delay period and remains in a sleep mode or low power mode to conserve battery power and increase battery lifetime. The access node suspends transmission of DCI to the wireless device during the suspension interval.

A first aspect of the disclosure comprises methods of control channel monitoring implemented by a wireless device. In one embodiment, the method comprises receiving DCI from an access node, the DCI including an indication to suspend control channel monitoring for a suspension interval. The method further comprises determining a delay and, following a delay period indicated by the delay and in response to the indication, suspending control channel monitoring for the suspension interval.

A second aspect of the disclosure comprises methods implemented by an access node of transmitting DCI to a wireless device. In one embodiment, the method comprises transmitting DCI to a wireless device, the DCI including an indication to suspend control channel monitoring for a suspension interval. The method further comprises determining a delay and, following a delay period indicated by the delay, suspending transmission of downlink control information to the wireless device for the suspension interval.

A third aspect of the disclosure comprises a wireless device configured to perform control channel monitoring. In one embodiment, the wireless device is configured to receive DCI from an access node, the DCI including an indication to suspend control channel monitoring for a suspension interval. The wireless device is further configured to determine a delay and, following a delay period indicated by the delay and in response to the indication, suspend control channel monitoring for the suspension interval.

A fourth aspect of the disclosure comprises an access node configured to transmit DCI to a wireless device. In one embodiment, the access node is configured to transmit DCI to a wireless device, the DCI including an indication to suspend control channel monitoring for a suspension interval. The access node is further configured to determine a delay and, following a delay period indicated by the delay, suspend transmission of downlink control information to the wireless device for the suspension interval.

A fifth aspect of the disclosure comprises a wireless device configured to perform control channel monitoring. The wireless device comprises communication circuitry for communicating with an access node in a wireless communication network and processing circuitry. The processing circuitry is configured to receive DCI from an access node, the DCI including an indication to suspend control channel monitoring for a suspension interval. The processing circuitry is further configured to determine a delay and, following a delay period indicated by the delay and in response to the indication, suspend control channel monitoring for the suspension interval.

A sixth aspect of the disclosure comprises an access node configured to transmit DCI to a wireless device. The access node comprises communication circuitry for communicating with a wireless device in a wireless communication network and processing circuitry. The processing circuitry is configured to transmit DCI to a wireless device, the DCI including an indication to suspend control channel monitoring for a suspension interval. The processing circuitry is further configured to determine a delay and, following a delay period indicated by the delay, suspend transmission of downlink control information to the wireless device for the suspension interval.

A seventh aspect of the disclosure comprises a computer program comprising executable instructions that, when executed by a processing circuitry in a wireless device, causes the wireless device to perform the method according to the first aspect.

An eighth aspect of the disclosure comprises a carrier containing a computer program according to the seventh aspect, wherein the carrier is one of an electronic signal, optical signal, radio signal, or computer readable storage medium.

A ninth aspect of the disclosure comprises a computer program comprising an access node, causes the access node to perform the method according to the second aspect.

A tenth aspect of the disclosure comprises a carrier containing a computer program according to the seventh aspect, wherein the carrier is one of an electronic signal, optical signal, radio signal, or computer readable storage medium.

DETAILED DESCRIPTION

Figure 1:
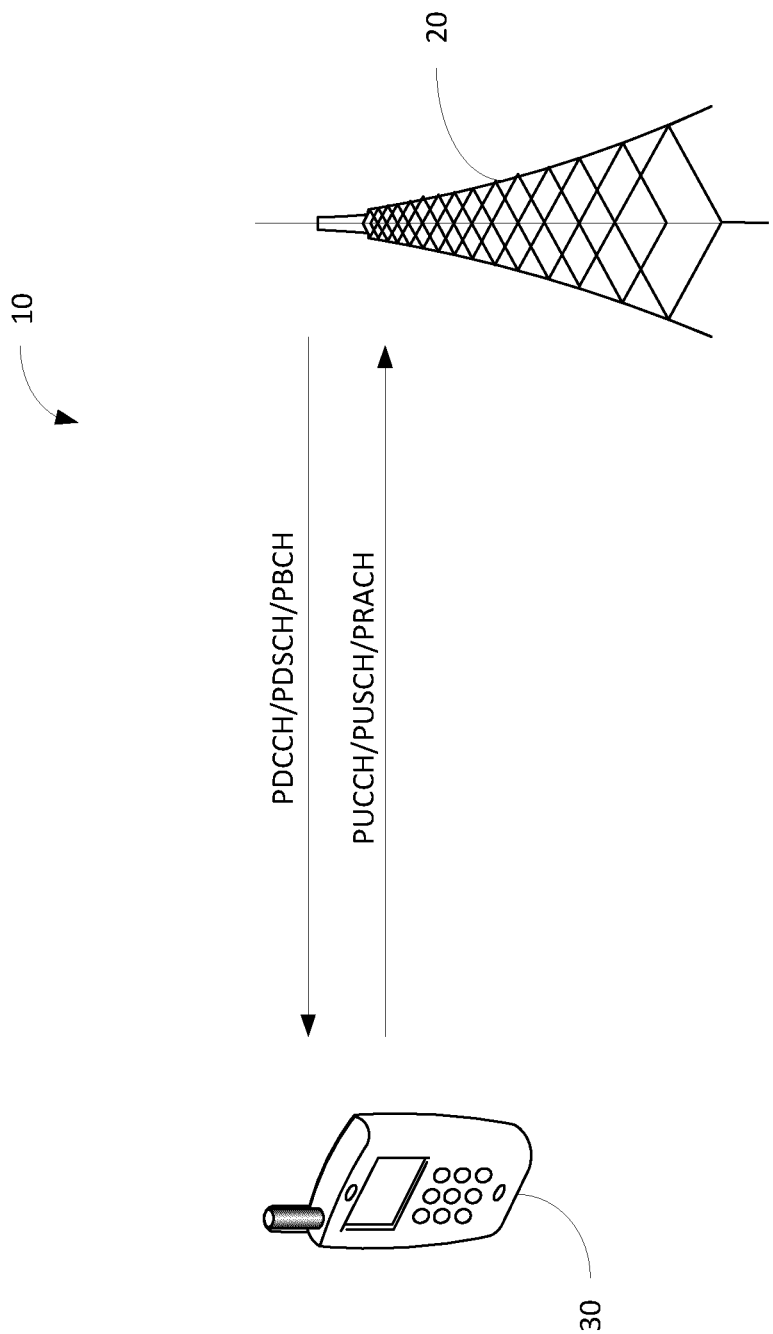
FIG. 1 illustrates an exemplary network implementing PDCCH skipping as herein described.

Referring now to the drawings, an exemplary embodiment of the present disclosure will be described in the context of Fifth Generation (5G) and Next Radio (NR) communication network. The power saving techniques herein described can be easily adapted by those skilled in the art for use in communication networks based on other radio access technologies (RATs), such as Long Term Evolution (LTE) networks, Wideband Code Division Multiple Access (WCDMA) networks, Code Division Multiple Access (CDMA) 2000 networks, Wireless Fidelity (WiFi) networks, Worldwide Interoperability for Microwave Access (WiMAX) networks, Wireless Local Area Networks (LANs) (WLANs), Narrowband Internet of Things (NB-IoT) networks, or other wireless communication networks.

FIG. 1 illustrates communications between an access node 20, also known as a base station, in a wireless communication network 10 and a wireless device 30. The access node 20 is sometimes referred to in applicable standards as an Evolved Node B (eNB) or 5G Node B (gNB). The wireless device 30 may comprise a cellular telephone, smart phone, laptop computer, notebook computer, tablet, machine-to-machine (M2M) communication devices (also referred to as machine-type communication (MTC) devices), or other devices with wireless communication capabilities.

Figure 2:
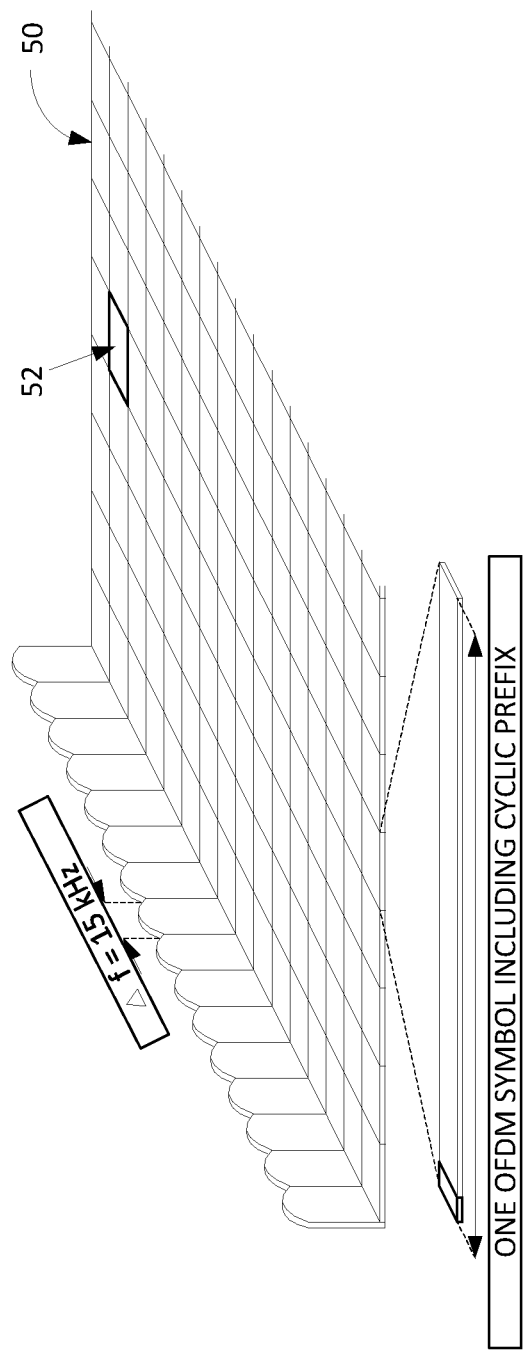
FIG. 2 illustrates a time-frequency grid used in NR network

The radio resources in NR can be viewed as a time-frequency grid 50 as shown in FIG. 2. In the time domain, the physical resources are divided into subframes. Each subframe includes a number of symbols. For a normal Cyclic Prefix (CP) length, suitable for use in situations where multipath dispersion is not expected to be extremely severe, a subframe comprises fourteen symbols. A subframe comprises twelve symbols if an extended CP is used. In the frequency domain, the physical resources are divided into subcarriers. The number of subcarriers varies according to the allocated system bandwidth. A subframe typically comprises two time slots, which may be further subdivided into mini-slots. A mini-slot comprises one or more symbol periods in a time slot. The smallest element of the time-frequency grid 50 is a resource element (RE) 52, which comprises the intersection of one subcarrier and one symbol.

The access node 20 transmits information to the wireless device 30 on DL physical channels. A physical DL channel corresponds to a set of REs carrying information originating from higher layers. The physical DL channels currently defined include the Physical Downlink Shared Channel (PDSCH), the Physical Downlink Control Channel (PDCCH) and the Physical Downlink Broadcast Channel (PBCH). The PDSCH is the main physical channel used for unicast DL data transmission, but also for transmission of random access responses (RARs), certain system information blocks (SIBs), and paging information. The PDCCH is used for transmitting downlink control information (DCI), mainly scheduling decisions required for reception of the PDSCH and UL scheduling grants (SGs) enabling transmission on Physical Uplink Shared Channel (PUSCH). The PBCH carries the basic system information (SI) required by the wireless device 30 to access the network 10.

The access node 20 is responsible for scheduling DL transmissions to the wireless device 30 on the PDSCH and for allocating resources for the DL transmissions. The access node 20 sends downlink control information (DCI) to the wireless device 30 on the PDCCH to schedule a DL transmission wireless device 30. The DCI includes scheduling information such as the allocated resources for the DL transmission and the modulation and coding scheme (MCS).

The wireless device 30 transmits information to the access node 20 on physical UL channels. A physical UL channel corresponds to a set of REs carrying information originating from higher layers. The physical UL channels currently defined include the Physical Uplink Shared Channel (PUSCH), the Physical Uplink Control Channel (PUCCH) and the Physical Random Access Channel (PRACH). The PUSCH is the UL counterpart to the PDSCH. The PUCCH is used by Wireless devices 30 to transmit UL control information (UCI), including Hybrid Automatic Repeat Request (HARQ) acknowledgements, channel state information (CSI) reports, etc. The PRACH is used for random access preamble transmission.

In NR, DCI is transmitted on the PDCCH. DCI typically contains DL and UL scheduling commands but can also contain other commands such as power control commands. A DCI consists of a payload part which is complemented with a Cyclic Redundancy Check (CRC). The DCI is sent on the PDCCH which is shared by multiple terminals and typically includes an identifier identifying the targeted wireless device for the DCI. In NR, the targeted wireless device is identified by scrambling the CRC with a Radio Network Temporary Identifier (RNTI) which is assigned to the targeted wireless device 30. Most common, a Cell RNTI (C-RNTI) assigned to the wireless device 30 is used to schedule a unicast transmission to the wireless device 30.

The payload together with scrambled CRC is encoded and transmitted on the PDCCH. The wireless device 30 tries to detect a PDCCH with multiple hypothesis w.r.t. payload size and location in the time-frequency grid based on its configured search spaces. Once the wireless device decodes a DCI, it de-scrambles the CRC with RNTI(s) that are monitored for the search space within which the PDCCH has been decoded. In case of a match, the wireless device 30 considers the detected DCI to be addressed to itself and follows the instructions in the DCI.

The PDCCH is transmitted in a so-called search space. A search space is a collection of possible time-frequency resource element hypothesis that can be used for PDCCH transmission by the access node 20. The wireless device 30 needs to blindly test the possible RE hypotheses of its configured search space(s). The different hypotheses can contain the same amount or different amount of REs. The number of REs used is determined by the Aggregation Level (AL). By varying the aggregation level, the PDCCH can be made more or less robust for a certain payload size, i.e., PDCCH link adaptation can be performed by adjusting the aggregation level.

In NR, a search space is configured via its CORESET (frequency-domain resources and time duration) as well as placement in time plus other information, e.g., aggregation level, DCI format, etc.

PDCCH skipping, or in short PDCCH skip, is a technique implemented using physical layer signaling to reduce power consumption attributable to PDCCH monitoring. To implement PDCCH skipping, the access node 20 sends instructions to the wireless device 30 to suspend PDCCH monitoring for a specified time period, or within the current active time of a Connected Discontinuous Reception (C-DRX) cycle. In response to the instructions from the access node 20, the wireless device 30 skips one or more PDCCH monitoring occasions and remains in a sleep mode or low power mode to conserve battery power and increase battery lifetime. The access node 20 suspends transmission of DCI to the wireless device 30 during the suspension interval.

The network configures the wireless device 30 to perform PDCCH skipping and signals configuration parameters that control the skipping behavior. In one embodiment, the signal to skip PDCCH monitoring is sent via DCI while configuration parameters for PDCCH skipping are sent via Radio Resource Control (RRC) or higher layer signaling. The configuration parameters control periodic application of PDCCH skipping, CSI reporting or other configured activities during PDCCH skipping, skipping for different numerologies, skipping for different cells, wireless device behavior during and after PDCCH skipping, signaling of wireless device assistance information to the network, etc.

When the wireless device 30 is configured for PDCCH skipping, the access node 20 can send the wireless device 30 DCI including an indication that the wireless device 30 should skip or suspend PDCCH monitoring for a specified time period that spans one or more PDCCH monitoring occasions and remain in a sleep mode or low power mode. In one embodiment, the indication to suspend may further include a suspension interval $T_s$ and a delay D. The suspension interval $T_s$ can be specified as a number of time slots, a number of symbols, a number of subframes, a specified duration of time, or a number of PDCCH monitoring occasions. The delay period is a specified period of time from the time that the DCI is received by the wireless device 30 to the start of the suspension interval. The delay D be specified as a number of time slots, a number of symbols, a number of subframes, a specified duration of time, or a number of PDCCH monitoring occasions. In other embodiment, the suspension interval, the delay period or both, can be pre-configured by higher layer signaling or specified by an applicable standard so that these parameters do not need to be included as part of the DCI.

Figure 3:
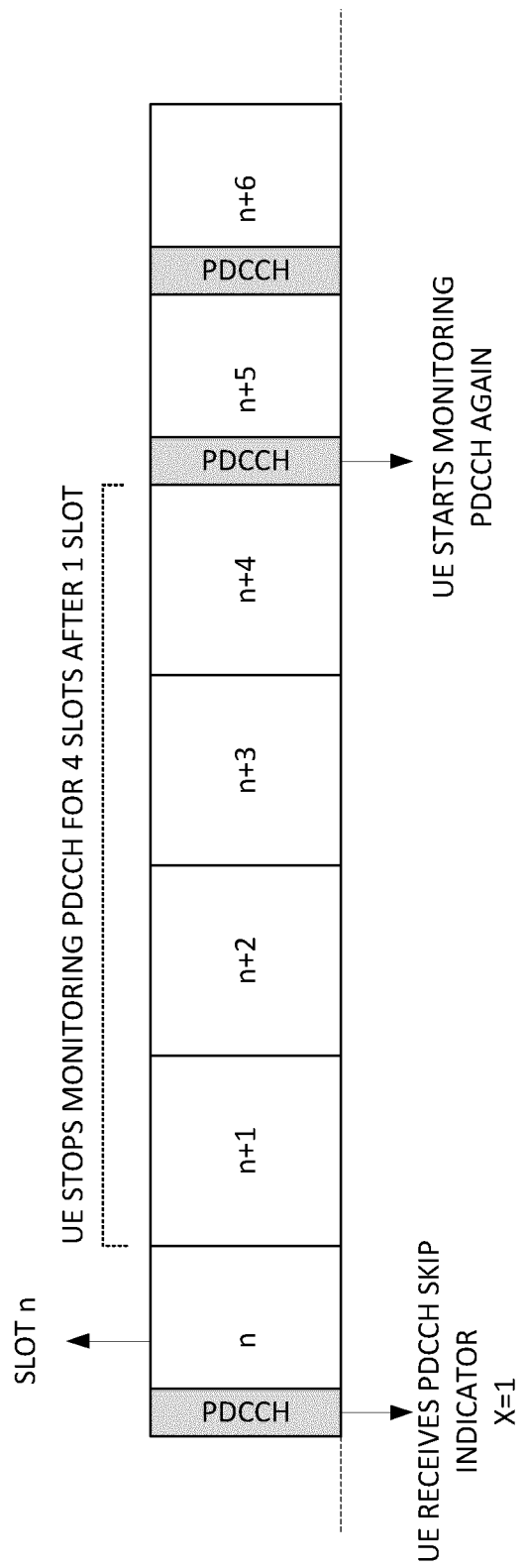
FIG. 3 illustrates an example of PDCCH skipping as herein described.

FIG. 3 illustrates an example of DCI-based PDCCH skip signaling. In this example, the wireless device 30 receives an indication to suspend PDCCH monitoring in slot n where D=1 and $T_s$=4. The values for D and $T_s$ are given as a number of time slots in this example. Because D=1, wireless device 30 waits until the end of the current time slot and then suspends PDCCH monitoring for the next 4 time slots. In the case that D=0, the wireless device 30 would suspend PDCCH monitoring immediately in the current time slot. The wireless device 30 resumes PDCCH monitoring in time slot n=5.

PDCCH Skip Signal Design

The PDCCH skip signal, also referred to herein as the PDCCH monitoring indication, can be specified as part of existing DCI formats, or new DCI formats can be defined to accommodate PDCCH skip signaling. In one example, an additional bit field can be configured in existing DCIs, e.g., DCI formats 0-1, and 1-1, indicating the PDCCH skip, or reserved fields in DCI format 1-0, or 0-0 can be used to configure the PDCCH skip bit field. The related bit field can be also configured as part of non-scheduling DCIs, such as DCI format 2-0. Alternatively, the PDCCH monitoring indication can be signaled by referring to an invalid index in the existing bit fields, e.g., a reserved modulation and coding scheme (MCS) index.

In another example, a new DCI formats, e.g., similar to DCI format 2-6, can be defined to explicitly indicate to the wireless device 30 that it can stop PDCCH monitoring. In such a case, the DCI can be further associated either with existing RNTIs, e.g., C-RNTI, or new device-specific or group common RNTIs. The latter can be used e.g., for multicast/broadcast or Internet of Things (IoT) use cases.

In one embodiment, the PDCCH monitoring indication comprises a bit field indicating that the wireless device 30 can skip PDCCH monitoring for $T_s$ slots, after a delay of D. In one approach, the indication includes only $T_s$, and D is determined based on the on-going and expected operations, e.g., an on-going Hybrid Automatic Repeat Request (HARQ) process. As one example, the following bit combinations can be used for PDCCH skip signaling:

00: do not skip
01: skip for 5 slots
10: skip for 10 slots
11: skip for 20 slots In other embodiments, a single bit can be used to indicate that the wireless device 30 should suspend PDCCH monitoring. In this case, the suspension interval $T_s$ and delay D can be pre-configured via higher layer signaling or specified by the applicable standard.

In some embodiments, more than 2 bits could be used for PDCCH skip signaling. For example, m>2 bits could be used to indicate $2^m-1$ suspension intervals of different length with one value reserved to indicate that PDCCH monitoring should not be skipped.

In some embodiments, the values for both $T_s$ and D can be specified by the bit field in the DCI. For example, the bit field could have 2 or more bits to indicate $T_s$ and 1 bit to indicate D.

In some embodiments, where C-DRX is used, a certain bit combination can be used to indicate that the wireless device 30 should stop PDCCH monitoring in the remaining inactivity timer or switch directly to a sleep mode or low power mode.

In addition to specifying the suspension interval, an additional bit or bits can be used to instruct the wireless device 30 on how long it should monitor the PDCCH after the suspension interval ends. This period is referred to herein as the wake-up duration Tw. Thus, a periodic skipping pattern can be defined. For example, bit 0 represents a duration of 1 slot and bit 1 represents duration of 4 slots. In this example, if $T_s$=10 time slots and $T_w$=0, the wireless device will suspend PDCCH monitoring for 10 time slots and monitor the PDCCH for 1 slot after which it will continue to repeat the pattern. If $T_s$=10 time slots and $T_w$=1, the wireless device 30 will suspend PDCCH monitoring for 10 time slots and monitor the PDCCH for 4 slots after which it will continue to repeat the pattern. Reception of a scheduling DCI then terminates the periodic PDCCH skip pattern. The skipping pattern may start after a delay D and continue until a scheduling DCI is received.

In some embodiments, the DCI can include values for $T_s$, D and $T_w$. For example, the bit field could have 2 or more bits to indicate $T_s$, 1 bit to indicate D and 1 or more bits to indicate $T_w$. In this case, the skipping pattern starts after a delay period determined based on the delay D. After the delay period, the wireless device 30 suspends PDCCH monitoring for time period $T_s$ and performs PDCCH monitoring for time period $T_w$. The wireless device 30 will then continue to alternate between $T_s$ and $T_w$ until a scheduling DCI is received.

In addition to PDCCH monitoring indication, the bit field may also include additional commands, e.g., cancel periodic/semi-periodic channel state information (CSI) reporting.

In embodiments where the PDCCH skipping is implemented via a DCI bit field, the various wireless device behaviors as described above can be configured through RRC signaling as a flexible lookup table indexed by the bit combinations that are sent via DCI.

In another embodiment, in addition to the indication bit field, an indication can be used to determine which wireless devices 30 or group of wireless devices 30 can skip PDCCH monitoring. This approach is particularly useful when group common PDCCH skipping is employed. The indication can be static, e.g., the location of the bit field in the DCI payload indicates which wireless device 30 or group of Wireless devices 30 the DCI applies to, or it can be dynamic. The location of the bit field can be configured by the network for the wireless device 30 through higher layer signaling, e.g., RRC reconfiguration.

In some embodiments, a single bit or flag can be included in DCI to enable or disable PDCCH skipping. For example, a "0" may disable PDCCH skipping while a "1" enables PDCCH skipping. When PDCCH skipping is enabled, the wireless device 30 looks for the indication bit field in the DCI.

As noted above, the delay D before the start of the suspension interval can be indicated explicitly as part of the DCI, or it can be determined implicitly. In some embodiments, the delay D may be considered as the number of slots required to finish the currently on-going HARQ processes, or the number of slots of the currently applied minimum scheduling offset (mink) in Release 16. In another embodiment, the delay D is predetermined a value. For example, the delay D may comprise a predetermined amount of time considered sufficient for PDCCH decoding. The value of the delay D can be given in a slot or in a symbol manner and can depend on the numerology of the bandwidth part (BWP) and wireless device capability. In addition, the delay D may also consider the location of the last symbol of the PDCCH monitoring occasion in a slot or the PDCCH monitoring case configured by the network to the wireless device.

In some embodiments, the delay D functions as a timer. PDCCH monitoring is not suspended immediately upon receipt of the PDCCH monitoring indication, but after expiration of a time period determined by the delay D. For example, the delay D may be given as a number of time slots, a number of subframes, a number of symbols, or an absolute period of time.

In some embodiments, the DCI may be transmitted on the PDSCH at the end of a downlink transmission to the wireless device 30. This approach avoids signaling on the PDCCH while not requiring the wireless device 30 to immediately cease PDCCH monitoring. Compared to sending an explicit PDCCH monitoring indication following the last slot of the data transmission, sending the PDCCH monitoring indication with a specified delay D in the last slot of the data transmission obviates the need for an additional PDCCH transmission. If another data transmission is scheduled before the end of the delay period, the pending PDCCH monitoring indication can be discarded or ignored.

PDCCH Skip Configuration

The wireless device 30 can be configured via higher layer signaling (e.g., RRC signaling) to apply a DCI-based PDCCH skip mechanism. The PDCCH skip configuration can include the following parameters:

- The bit field and/or indication definition of each allowable bit combination
- The location of the bit field and, if the DCI is a group common DCI, the association of each bit field location with a corresponding wireless device.
- In case a new DCI format is used, the size of the DCI can also be configured.
- The associated search space (SS) and CORESET. In one embodiment, the wireless device is only configured to monitor the PDCCH skip DCI in a user-specific search space (USS), particularly if the PDCCH skip is part of the wireless device-specific DCIs, e.g. 0-1 or 1-1. In another embodiment, the wireless device is configured to monitor PDCCH skip DCI in a common search space (CSS), e.g., when group common PDCCH skip is employed.
- Scope of configuration. The PDCCH skip configuration can be configured per bandwidth part (BWP), cell, cell group (CG), band, band combination or wireless device 30.
- C-DRX association. In one embodiment, PDCCH skipping can only be configured if it is associated with a C-DRX configuration, or in another words, if the wireless device 30 is also configured with C-DRX. In another embodiment, the PDCCH skipping can be configured even if C-DRX is not configured for the wireless device 30.

Configurations for Different Bandwidth Parts

The wireless device 30 can be configured to apply PDCCH skipping per BWP, i.e., as part of the DCI configuration. In this case, the PDCCH monitoring indication is only applicable to a specific DCI if it is configured for a specific BWP. When the PDCCH monitoring indication instructs the wireless device 30 to skip PDCCH monitoring in BWP1, and the wireless device 30 switches to BWP2 during the suspension interval, e.g., due to BWP1 inactivity timer expiration, the wireless device 30 will return to PDCCH monitoring in BWP2. In another embodiment, the PDCCH monitoring indication in the current BWP is also applicable to the future BWP. In this case, if the BWP change occurs while the PDCCH monitoring is suspended in BWP1, the suspension interval carries over to BWP2 and continues until the end of the suspension interval.

Configurations for Different Cells, Cell Groups or Bands

The wireless device 30 can be configured to apply PDCCH skipping per cell or per cell group. In this case, the PDCCH monitoring indication is applicable to the whole cell or cell group and its underlying BWPs. If PDCCH skipping is configured per cell, the PDCCH skipping configuration applies to all carriers within the cell. When the wireless device 30 receives a PDCCH monitoring indication on one carrier, it will suspend PDCCH monitoring in all carriers in the same cell. If PDCCH skipping is configured per cell group, the PDCCH skipping configuration applies to all cells within the cell group. When the wireless device 30 receives a PDCCH monitoring indication in one cell, it will suspend PDCCH monitoring in all cells in the same cell group.

PDCCH skipping can also be configured per band or band combination. If PDCCH skipping is configured per band or band combination, the PDCCH skipping configuration applies to all carriers within the band or band combination. When the wireless device 30 receives a PDCCH monitoring indication on one carrier within a band or band combination, it will suspend PDCCH monitoring in all other carriers in the same band or band combination.

In a more aggressive approach, PDCCH skipping can be configured per wireless device 30. In this case, if the wireless device 30 is instructed to suspend PDCCH monitoring in any cell or BWP, it suspends PDCCH monitoring in all cells and underlying BWPs.

Configurations for Carrier Aggregation

When carrier aggregation is used, the serving cells for a wireless device 30 may have different numerologies. In embodiments where PDCCH skipping is configured per cell, the handling is straightforward. A PDCCH monitoring indication is transmitted on the PDCCH for each cell or carrier and the cell-specific or carrier-specific configuration for PDCCH skipping is applied in each cell or carrier. Thus, PDCCH monitoring can be suspended in some serving cells or carriers while PDCCH monitoring continues in other serving cells or carriers.

In another embodiment, a PDDCH monitoring indication transmitted in any serving cell or carrier may trigger suspension of PDCCH monitoring in all other serving cells or carriers. In one variation of this approach, a common delay D can be used for all serving cells or carriers and the calculation of the delay period for each serving cell or carrier is calculated based on the common delay D and the numerology. For example, if the delay D is given as a number of time slots, the suspension interval will start in each serving cell or carrier after the specified number of time slots. For cells or carriers with different numerologies, the length of the time slot in absolute time is different depending on the numerology so the length of the delay period will vary depending on the numerology of the cell or carrier. If the delay D is given as an absolute period of time, the wireless device 30 can be configured to suspend PDCCH monitoring in the same time instance for all cells. In another embodiment, if the wireless device 30 is configured with serving cells or carriers having different numerologies and the delay D is given as an absolute period of time, the wireless device 30 determines the length of the delay period, i.e., the start of the suspension interval, by rounding the delay D to match the start of the next time slot following the end of the absolute time period. For example, the wireless device 30 can set a delay timer=D and suspend PDCCH monitoring at the start of the first time slot following expiration of the timer.

Similarly, a common suspension interval $T_s$ can be applied to all serving cells and carriers. If the delay $T_s$ is given as a number of time slots, the suspension interval will end in each serving cell or carrier after the specified number of time slots. Thus, the length of the time slot in absolute time for cells or carriers with different numerology will be different. If the suspension interval $T_s$ is given as an absolute period of time, the wireless device 30 can be configured to return to PDCCH monitoring at the start of the time slot following the end of the suspension interval. For example, the wireless device 30 can set a suspension timer=$T_s$ at the start of the suspension interval and return to PDCCH monitoring at the start of the first time slot following expiration of the timer.

In another embodiment, all serving cells or carriers can use the numerology of one of the cells as the reference for determining the delay period and/or suspension interval based on a common delay D and/or suspension interval $T_s$. The cell selected as a reference could be, for example, the cell with the lowest numerology or the cell in which the PDCCH monitoring indication is received. In this approach, all serving cells or carriers will suspend PDCCH monitoring at the same time if a common delay D is given in terms of time slots even when different numerologies are used. If a common suspension interval $T_s$ is given in terms of time slots, the suspension interval will also end at the same time in each serving cell or carrier even when different numerologies are used.

Wireless Device Considerations

A wireless device 30 may be configured with multiple search spaces for PDCCH monitoring. For example, the wireless device 30 may be configured with a common search space (CSS) shared with other Wireless devices 30 and with one or more user-specific search spaces (USSs). The monitoring configuration, e.g., periodicity, may be different for each search space. In some embodiments, the wireless device 30 can be configured to suspend PDCCH monitoring in all the configured search spaces after receiving the PDCCH monitoring indication. In another embodiment, the wireless device 30 can suspend PDCCH monitoring in a first subset of the search spaces while continue to monitor the PDCCH. As an example, the wireless device 30 can suspend PDCCH monitoring in all wireless device-specific search spaces while continuing to monitor the common search spaces or vice versa. The search space that is monitored during the PDCCH skip duration can be configured sparser than search spaces for which PDCCH monitoring is suspended.

The wireless device 30 may be configured to perform periodic/semi-periodic activities or tasks, such as CSI reporting or sounding reference signal (SRS) transmission. As another example, the wireless device 30 may have a configured grant for uplink or downlink transmission. In some embodiments, the configured activities continue even when PDCCH monitoring is suspended. In other embodiments, the wireless device 30 may suspend one or more of the configured activities or tasks when PDCCH monitoring is suspended. The wireless device 30 can stop the configured activities as well at the same time as PDCCH skip is in progress. The wireless device's behavior in this regard can be configured by the network as part of the PDCCH skip configuration. That is, the PDCCH skip configuration determines whether the wireless device 30 continues the configured activities or not when PDCCH monitoring is suspended. Furthermore, the configuration can either apply to individual configured activities, or to all configured activities. For example, the wireless device 30 may suspend SRS transmission, but continue CSI measurement and reporting, or vice versa.

When an access node 20 implements cross-carrier scheduling, the PDCCH for the PDSCH in a first cell may be transmitted in a different cell. For example, the PDCCH for the PDSCH in both Cell A and Cell B may be transmitted in cell A. In one embodiment, when the PDCCH monitoring indication is received on the PDCCH associated with the PDSCH in Cell A, the wireless device 30 is configured to suspend PDCCH monitoring on the PDCCH associated with the PDSCH in Cell A while continuing PDCCH monitoring on the PDCCH associated with Cell B. Similarly, when the PDCCH monitoring indication is received on the PDCCH associated with the PDSCH in Cell B, the wireless device 30 is configured to suspend PDCCH monitoring on the PDCCH associated with the PDSCH in Cell B while continuing PDCCH monitoring on the PDCCH associated with Cell A. In another embodiment, when the PDCCH monitoring indication is received on the PDCCH associated with the PDSCH in either Cell A or Cell B, the wireless device 30 is configured to suspend PDCCH monitoring on the PDCCHs associated with the PDSCHs in both cells.

If the wireless device 30 is configured for C-DRX and the inactivity timer (IAT) is running when the suspension interval ends, the wireless device monitors the PDCCH until the IAT expires and then transitions to the OFF duration of the C-DRX cycle. If the IAT has expired when the suspension interval ends, the wireless device 30 may transition directly to the OFF duration of the C-DRX cycle.

In some embodiments, the network may cancel an earlier indication or request to suspend PDCCH monitoring. As previously noted, PDCCH monitoring is not suspended until the end of a delay period. During this delay period, the network can signal the wireless device 30 to explicitly cancel a pending suspension interval. The pending suspension interval can also be implicitly canceled by certain actions. For example, the network may send a downlink grant to the wireless device 30 during the delay period, which is taken as an implicit command to cancel the pending suspension interval.

In some cases, the wireless device 30 may send a scheduling request (SR) during the suspension interval. In this case, the wireless device 30 can be configured to cancel the pending suspension interval when it sends the SR during period. Alternatively, the wireless device 30 can be configured to monitor a specific search space for an uplink grant during the suspension interval and suspend PDCCH monitoring in all other search spaces. In other embodiments, the pending suspension interval is not cancelled when the SR is transmitted but is canceled if a UL grant is received during the delay period.

In some cases, the wireless device 30 may change the BWP during the delay period, either because of BWP inactivity timer expiration or explicit request to change the BWP. In this case, the wireless device 30 can be configured to cancel the pending suspension interval when it changes BWP during the suspension interval. In some embodiments, where the same PDCCH skip configuration applies to the new BWP, the pending suspension interval is not cancelled and the PDCCH monitoring is suspended in the new BWP The acts that are effective to cancel a pending suspension interval can be configured by the network via higher layer signaling (e.g., RRC signaling). For example, the network may configure the wireless device 30 to cancel the pending suspension interval if it receives a downlink grant, if it sends a SR, if it receives a new uplink grant, and/or if it switches BWPs.

In some cases, the wireless device 30 may have an active HARQ process when it receives a PDCCH monitoring indication. In this case, the wireless device 30 can be configured to continue monitoring the PDCCH related to on-going HARQ process and to suspend PDCCH monitoring in one or more other PDCCHs. In another embodiment, the wireless device 30 can be configured to delay the start of the suspension interval until the HARQ process is finished.

Network Considerations

The network determines the PDCCH skip configuration for the wireless device 30 and configures the wireless device 30 via higher layer signaling, e.g., RRC signaling. For example, the access node 20 can configure the length of the delay D, the length of the suspension interval Ts, the wake-up period Tw (for a periodic PDCCH skipping), and actions that cancel a pending suspension interval. The determination of the PDDCH skip configuration can be based on factors such as the type of the wireless device 30, acceptable additional delay, acceptable throughput degradation, wireless device assistance information, and the scheduling flexibility. In one embodiment, the length of the suspension interval is determined by the scheduler delays, e.g., the delay between subsequent scheduling instances for a given wireless device 30 in a round-robin or similar scheme.

The network also determines when to suspend PDCCH monitoring and transmits the PDCCH monitoring indication to the wireless device 30. The decision to suspend PDCCH monitoring can be based on factors such as the DL buffer status at the network, the uplink buffer status report sent by the wireless device, the type of wireless device 30, the type of applications running on the wireless device 30, known transmission patterns of the wireless device 30. and expected arrival time of uplink or downlink data.

Wireless Device Assistance Information

Figure 4:
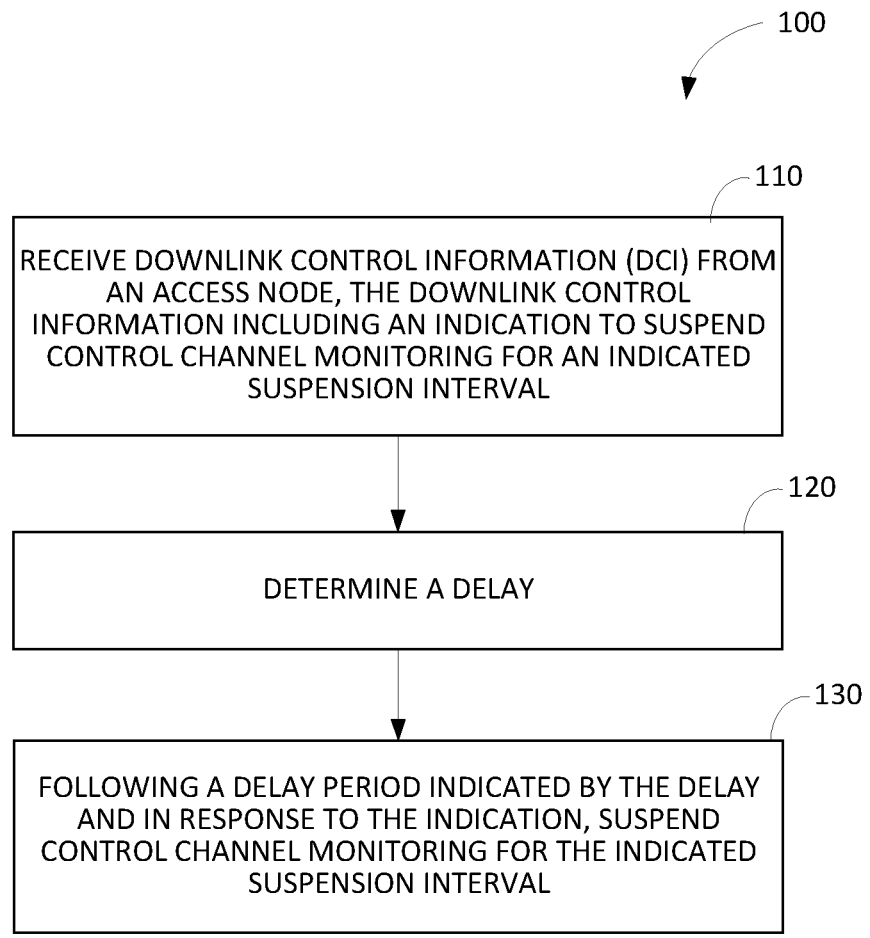
FIG. 4 illustrates an exemplary method implemented by a wireless device of suspending PDCCH monitoring.

In one example, as part of the capability signaling, the wireless device 30 can inform the network 10 that it has the capability to implement PDCCH skipping. Additionally, the wireless device 30 can indicates, as part of the wireless device capability or in the form of assistance information, its preference with regard to the configurable PDCCH skip configuration parameters, e.g., the preferred suspension interval or preferred delay, and other configuration parameters FIG. 4 illustrates a method 100 of control channel monitoring implemented by a wireless device 30. The wireless device 30 receives DCI from an access node (block 110). The DCI includes an indication to suspend control channel monitoring for a suspension interval. The wireless device 30 further determines a delay (block 120). Following a delay period indicated by the delay and in response to the indication, the wireless device suspends control channel monitoring for the suspension interval (block 130).

In some embodiments of the method 100, the suspension interval comprises one or more control channel monitoring occasions.

In some embodiments of the method 100, determining a delay comprises receiving the delay from the access node 20.

In some embodiments of the method 100, the delay is received in the downlink control information.

In some embodiments of the method 100, the delay is received in radio resource control (RRC) signaling or in a medium access control (MAC) control element (MAC CE).

In some embodiments of the method 100, determining a delay comprises determining the delay based on one or more configurations including one or more delay parameters for determining the delay.

In some embodiments of the method 100, the delay parameters of the one or more configurations are preconfigured based on an applicable standard.

In some embodiments of the method 100, the delay parameters of the monitoring configuration are received from the access node 20.

In some embodiments of the method 100, the one or more configurations comprise a monitoring configuration sent from the access node 20 to the wireless device 30.

In some embodiments of the method 100, delay period comprises a time period following completion of an ongoing process.

In some embodiments of the method 100, the delay period comprises a time period following completion of a retransmission process.

In some embodiments of the method 100, the delay period comprises a time period following completion of a scheduled measurement and reporting process.

In some embodiments of the method 100, the delay period comprises a time period following completion of a scheduled transmission.

In some embodiments of the method 100, the wireless device 30 continues control channel monitoring for a control channel with an on-going HARQ process and suspends control channel monitoring in one or more other downlink control channels.

In some embodiments of the method 100, the delay period is defined by one of a number of time slots a number of symbols, a number of subframes, a specified duration of time, or a number of control channel monitoring occasions.

In some embodiments of the method 100, the delay comprises the number of slots of the currently applied minimum scheduling offset.

In some embodiments of the method 100, the indication to suspend control channel monitoring applies to monitoring occasions associated with a specific BWP and wherein the wireless device 30 skips one or more monitoring occasions configured for the specific BWP occurring during the suspension interval.

In some embodiments of the method 100, the delay D depends on the numerology of the BWP.

In some embodiments of the method 100, the wireless device 30 continues monitoring a downlink control channel in one or more other BWPs during the suspension interval.

In some embodiments of the method 100, when the wireless device 30 switches from the specified BWP to a different BWP during the suspension interval, the wireless device 30 skips one or more monitoring occasions configured for the different BWP occurring during the suspension interval.

In some embodiments of the method 100, the indication to suspend control channel monitoring applies to monitoring occasions associated with a specific cell and wherein the wireless device 30 skips one or more monitoring occasions configured for the specific cell occurring during the suspension interval.

In some embodiments of the method 100, the wireless device 30 continues monitoring a downlink control channel in one or more other cells or carriers during the suspension interval.

In some embodiments of the method 100, the indication to suspend control channel monitoring applies to monitoring occasions associated with a specific cell group or carrier group and wherein the wireless device 30 skips one or more monitoring occasions configured for the specific cell group or carrier group occurring during the suspension interval.

In some embodiments of the method 100, the wireless device 30 continues monitoring a downlink control channel in one or more other cells or carriers not included in the specified cell group or carrier group during the suspension interval.

In some embodiments of the method 100, the indication to suspend control channel monitoring applies to monitoring occasions associated with a specific band or band combination and wherein the wireless device 30 skips one or more monitoring occasions configured for the specific band or band combination occurring during the suspension interval.

In some embodiments of the method 100, the wireless device 30 continues monitoring a downlink control channel in one or more other bands outside the specified band or band combination during the suspension interval.

In some embodiments of the method 100, the indication to suspend control channel monitoring applies to all monitoring occasions configured for the wireless device 30 and wherein the wireless device 30 skips all configured monitoring occasions occurring during the suspension interval.

In some embodiments of the method 100, the indication to suspend control channel monitoring is transmitted on a downlink control channel.

In some embodiments of the method 100, the indication to suspend control channel monitoring is transmitted at the end of a downlink transmission on a downlink shared channel.

In some embodiments of the method 100, the indication to suspend control monitoring applies to multiple cells or carriers and wherein the delay period is determined for each cell or carrier based on a common delay applicable to all cells or carriers and the numerology of the cell or carrier.

In some embodiments of the method 100, the indication to suspend control channel monitoring applies to multiple cells or carriers wherein the delay period is determined for each cell or carrier based on separate delay for each cell or carrier.

In some embodiments of the method 100, when the wireless device 30 is configured with multiple cells or carriers having different numerologies and the delay D is given as an absolute period of time, the wireless device 30 determines the delay and/or start of the suspension interval by rounding the delay D to match the start of the next time slot following the end of the absolute time period.

In some embodiments of the method 100, when the wireless device 30 is configured with multiple cells or carriers having different numerologies and a common delay D is given for all cells or carriers, the wireless device 30 determines the delay and/or start of the suspension interval using the numerology of a reference cell or carrier.

In some embodiments of the method 100, when the wireless device 30 is configured with multiple cells or carriers having different numerologies and a common suspension interval is given for all cells or carriers, the wireless device 30 determines the suspension interval using the numerology of a reference cell or carrier.

In some embodiments of the method 100, the cell or carrier selected as a reference comprises the cell or carrier with the lowest numerology.

In some embodiments of the method 100, the indication to suspend control channel monitoring is received in a first cell or carrier and the delay period in a second cell is determined based on a start time of the suspension interval in the first cell or carrier.

In some embodiments of the method 100, the wireless device 30 skips one or more monitoring occasions occurring during the suspension interval in a first search space while continuing to monitor a control channel in a second search space during the suspension interval.

In some embodiments of the method 100, the first search space is a common search space and the second search space is a user-specific search space.

In some embodiments of the method 100, the first search space is a user-specific search space and the second search space is a common search space.

In some embodiments of the method 100, the second search space is used for cross-carrier scheduling.

Some embodiments of the method 100 further comprise suspending at least one of channel state information (CSI) reporting, sounding reference signal (SRS) transmission, or a configured grant during the suspension interval from the wireless device 30 to the network.

Some embodiments of the method 100 further comprise receiving control information from the access node 20 instructing the wireless device 30 to suspend at least one of channel state information (CSI) reporting, sounding reference signal (SRS) transmission, or a configured grant during the suspension interval.

Some embodiments of the method 100 further comprise cancelling suspension of control channel monitoring when, during the delay period, the wireless device 30 receives a downlink grant from the access node 20, sends a request for an uplink grant to the access node 20, or switches between BWPs.

Figure 5:
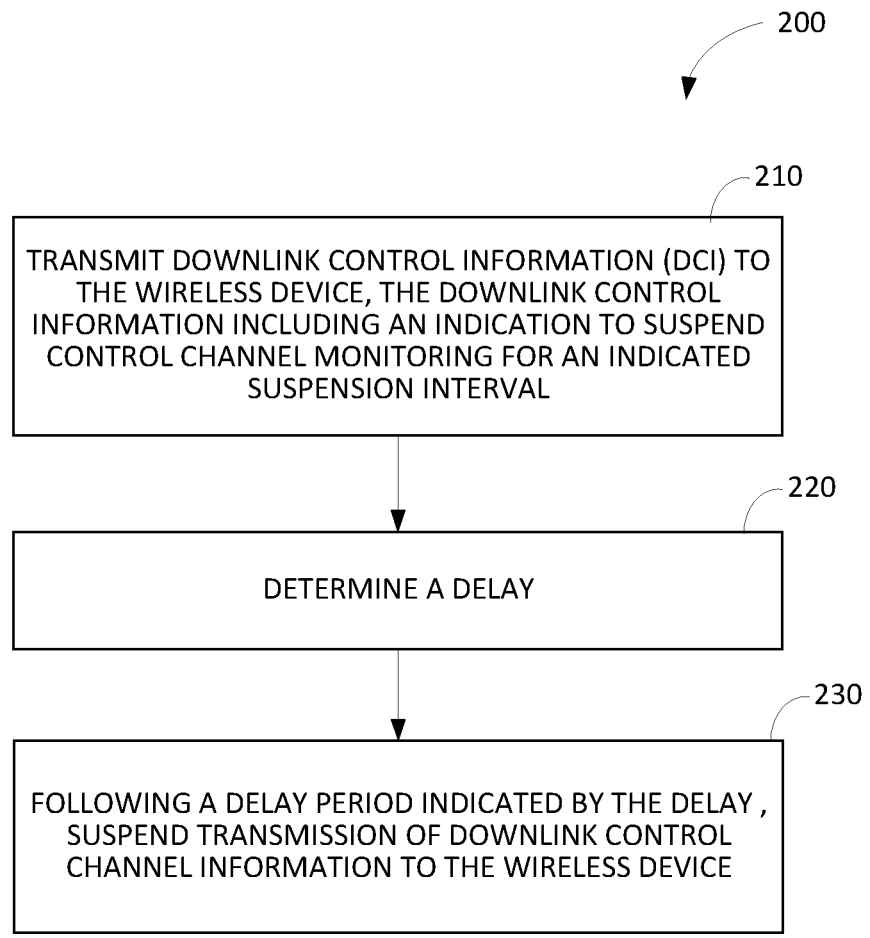
FIG. 5 illustrates an exemplary method implemented by an access node to suspend transmission of DCI when PDCCH monitoring is suspended.

FIG. 5 illustrates a method 200 implemented by an access node 20 of transmitting DCI to a wireless device 30. The access node 20 transmits DCI to the wireless device 30 (block 210). The DCI includes an indication to suspend control channel monitoring for a suspension interval. The access node 20 further determines a delay (block 220). Following a delay period indicated by the delay, the access node 20 suspends transmission of downlink control information to the wireless device 30 for the suspension interval (block 230).

In some embodiments of the method 200, the suspension interval comprises one or more control channel monitoring occasions.

Some embodiments of the method 200 further comprise transmitting the delay to the wireless device 30.

In some embodiments of the method 200, the delay is transmitted to the wireless device 30 in the downlink control information.

In some embodiments of the method 200, the delay is transmitted to the wireless device 30 in radio resource control (RRC) signaling or in a medium access control (MAC) control element (MAC CE).

In some embodiments of the method 200, determining a delay comprises determining the delay based one or more configurations including one or more delay parameters for determining the delay.

In some embodiments of the method 200, the delay parameters of the one or more configurations are preconfigured based on an applicable standard.

In some embodiments of the method 200, the delay parameters of the one or more configurations are received from the access node 20.

In some embodiments of the method 200, the one or more configurations comprise a monitoring configuration sent from the access node 20 to the wireless device 30.

In some embodiments of the method 200, the delay period comprises a predetermined time period following completion of an ongoing process at the wireless device 30.

In some embodiments of the method 200, the delay period comprises a time period following completion of a retransmission process.

In some embodiments of the method 200, the delay period comprises a time period following completion of a scheduled measurement and reporting process.

In some embodiments of the method 200, the delay period comprises a time period following completion of a scheduled transmission to or from the wireless device 30.

In some embodiments of the method 200, the access node 20 sends DCI to the wireless device 30 in a downlink control channel with an on-going HARQ process and suspends transmission of DCI in one or more other downlink control channels.

In some embodiments of the method 200, the delay period is defined by one of a number of time slots, a number of symbols, a number of subframes, a specified duration of time, or a number of control channel monitoring occasions.

In some embodiments of the method 200, the delay comprises the number of slots of the currently applied minimum scheduling offset.

In some embodiments of the method 200, the indication to suspend control channel monitoring applies to monitoring occasions associated with a specific BWP and wherein the access node 20 skips one or more monitoring occasions configured for the specific BWP occurring during the suspension interval.

In some embodiments of the method 200, the delay D depends on the numerology of the BWP.

In some embodiments of the method 200, the access node 20 continues sending downlink control information to the wireless device 30 in one or more other BWPs during the suspension interval.

In some embodiments of the method 200, when the wireless device 30 switches from the specified BWP to a different BWP during the suspension interval, the access node 20 suspends transmission of downlink control information to the wireless device 30 in one or more monitoring occasions configured for the different BWP occurring during the suspension interval.

In some embodiments of the method 200, the indication to suspend control channel monitoring applies to monitoring occasions associated with a specific cell and wherein the access node 20 suspends transmission of downlink control information to the wireless device 30 in one or more monitoring occasions configured for the specific cell occurring during the suspension interval.

In some embodiments of the method 200, the access node 20 continues sending downlink control information to the wireless device 30 in one or more other cells or carriers during the suspension interval.

In some embodiments of the method 200, the indication to suspend control channel monitoring applies to monitoring occasions associated with a specific cell group or carrier group and wherein the access node 20 suspends transmission of downlink control information to the wireless device 30 in one or more monitoring occasions configured for the specific cell group or carrier group occurring during the suspension interval.

In some embodiments of the method 200, the access node 20 continues sending downlink control information to the wireless device 30 in one or more other cells or carriers not included in the specified cell group or carrier group during the suspension interval.

In some embodiments of the method 200, the indication to suspend control channel monitoring applies to monitoring occasions associated with a specific band or band combination and wherein the access node 20 suspends transmission of downlink control information to the wireless device 30 in one or more monitoring occasions configured for the specific band or band combination occurring during the suspension interval.

In some embodiments of the method 200, the access node 20 continues sending downlink control information to the wireless device 30 in one or more other bands outside the specified band or band combination during the suspension interval.

In some embodiments of the method 200, the indication to suspend control channel monitoring applies to all monitoring occasions configured for the wireless device 30 and wherein the access node 20 suspends transmission of downlink control information to the wireless device 30 in all configured monitoring occasions occurring during the suspension interval.

In some embodiments of the method 200, the indication to suspend control channel monitoring applies to multiple cells or carriers and wherein the delay period is determined for each cell or carrier based on a common delay applicable to all cells or carriers and the numerology of the cell or carrier.

In some embodiments of the method 200, the indication to suspend control channel monitoring applies to multiple cells or carriers and wherein the delay period is determined for each cell or carrier based on separate delay for each cell or carrier.

In some embodiments of the method 200, when the wireless device 30 is configured with multiple cells or carriers having different numerologies and the delay D is given as an absolute period of time, the delay and/or start of the suspension interval is determined by rounding the delay D to match the start of the next time slot following the end of the absolute time period.

In some embodiments of the method 200, when the wireless device 30 is configured with multiple cells or carriers having different numerologies and a common delay D is given for all cells or carriers, the delay and/or start of the suspension interval is determined using the numerology of a reference cell or carrier.

In some embodiments of the method 200, when the wireless device 30 is configured with multiple cells or carriers having different numerologies and a common suspension interval is given for all cells or carriers, the suspension interval is determined using the numerology of a reference cell or carrier.

In some embodiments of the method 200, the cell or carrier selected as a reference comprises the cell or carrier with the lowest numerology.

In some embodiments of the method 200, the indication to suspend control channel monitoring is transmitted on a downlink control channel.

In some embodiments of the method 200, the indication to suspend control channel monitoring is transmitted at the end of a downlink transmission on a downlink shared channel.

In some embodiments of the method 200, the indication to suspend control channel monitoring is transmitted in a first cell or carrier, and the delay period in a second cell is determined based on a start time of the suspension interval in the first cell or carrier.

In some embodiments of the method 200, the access node 20 suspends transmission of downlink control information in one or more monitoring occasions occurring during the suspension interval in a first search space while continuing to send downlink control information in a second search space during the suspension interval.

In some embodiments of the method 200, the first search space is a common search space and the second search space is a user-specific search space.

In some embodiments of the method 200, the first search space is a user-specific search space and the second search space is a common search space.

In some embodiments of the method 200, the second search space is used for cross-carrier scheduling.

Some embodiments of the method 200 further comprise suspending at least one of channel state information (CSI) reporting, sounding reference signal (SRS) transmission, or a configured grant for the wireless device 30 during the suspension interval from the wireless device 30 to the network.

Some embodiments of the method 200 further comprise transmitting control information to the wireless device 30 instructing the wireless device 30 to suspend at least one of channel state information (CSI) reporting, sounding reference signal (SRS) transmission, or a configured grant during the suspension interval to the network.

Some embodiments of the method 200 further comprise cancelling suspension of control channel monitoring when, during the delay period, the access node 20 sends a downlink grant to the wireless device 30, receives a request for an uplink grant from the wireless device 30, or instructs the wireless device 30 to switch BWPs.

An apparatus can perform any of the methods herein described by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 6:
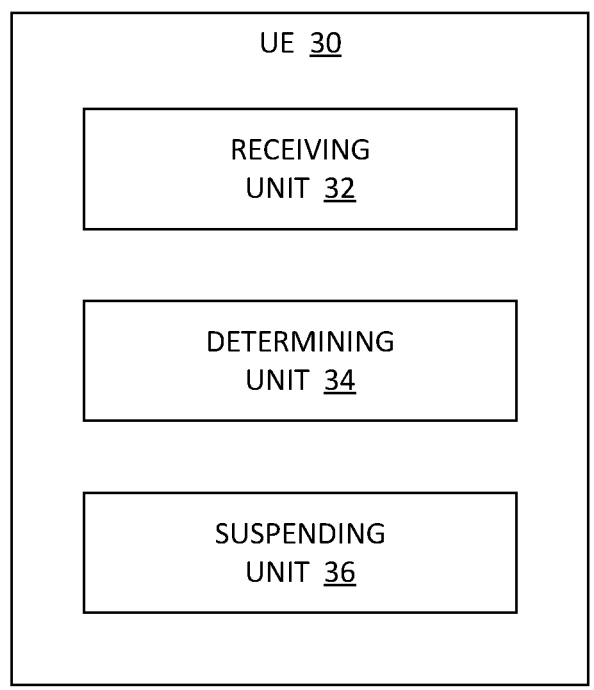
FIG. 6 illustrates an exemplary wireless device configured to suspend PDCCH monitoring.

FIG. 6 illustrates wireless device 30 configured to suspend control channel monitoring. The wireless device 30 comprises a receiving unit 32, a determining unit 34 and a suspending unit 36. The various units 32-36 can be implemented by hardware and/or by software code that is executed by one or more processors or processing circuits. The receiving unit 32 is configured to receive DCI from an access node. The DCI includes an indication to suspend control channel monitoring for a suspension interval. The determining unit 34 is configured to determine a delay. The suspending unit 36 is configured to, following a delay period indicated by the delay and in response to the indication, suspend control channel monitoring for the suspension interval.

Figure 7:
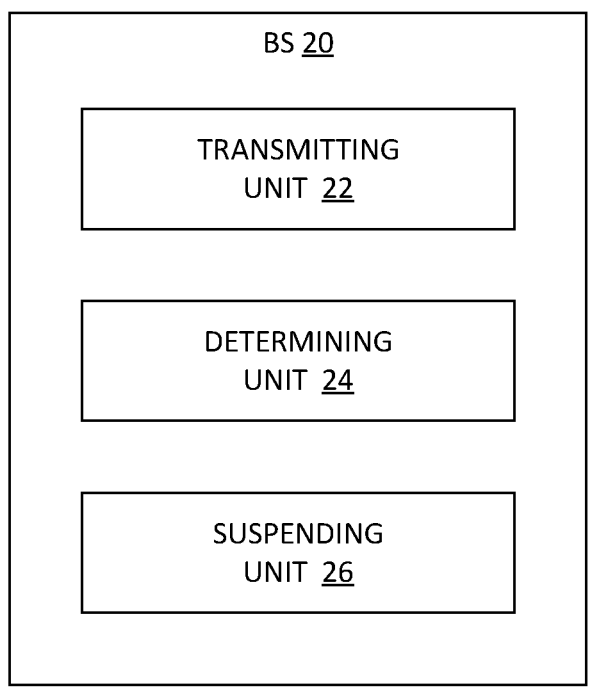
FIG. 7 illustrates an exemplary access node configured to suspend transmission of DCI when PDCCH monitoring is suspended.

FIG. 7 illustrates an access node 20 configured to suspend transmission of DCI to a wireless device 30 that has suspended PDCCH monitoring. The access node 20 comprises a transmitting unit 22, a determining unit 24 and a suspending unit 26. The various units 22-26 can be implemented by hardware and/or by software code that is executed by one or more processors or processing circuits. The transmitting unit 22 is configured to transmit DCI to the wireless device 30. The DCI includes an indication to suspend control channel monitoring for a suspension interval. The determining unit 24 is configured to determine a delay. The suspending unit 26 is configured to, following a delay period indicated by the delay, suspends transmission of downlink control information to the wireless device 30 for the suspension interval.

Figure 8:
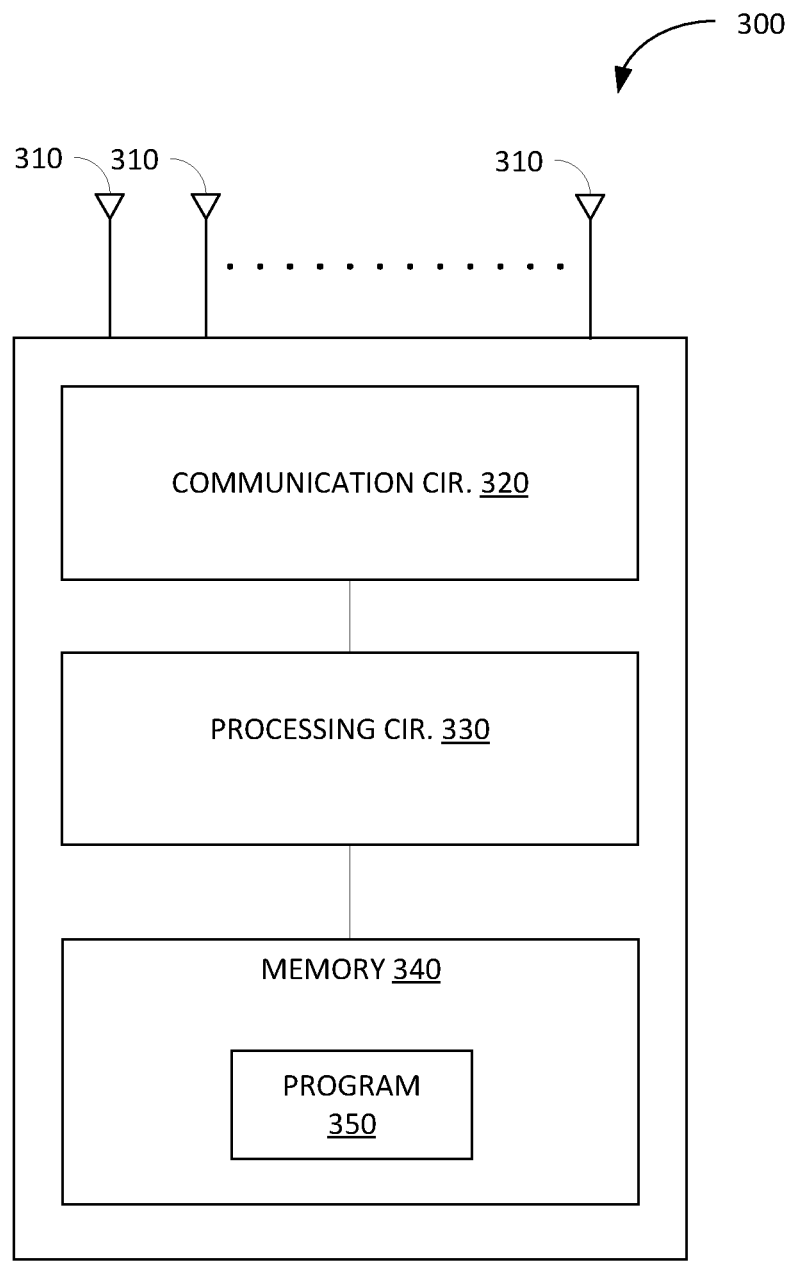
FIG. 8 illustrates an exemplary wireless device configured to suspend PDCCH monitoring.

FIG. 8 illustrates wireless device 300 configured to suspend control channel monitoring. The wireless device 300 comprises communication circuitry 320 for communicating with an access node 20 in a wireless communication network, processing circuitry 330, and memory 340.

The communication circuitry 320 is coupled to one or more antennas 310 and comprises the radio frequency (RF) circuitry for transmitting and receiving signals over a wireless communication channel. In one exemplary embodiment, the communication circuitry 320 comprises a transmitter and receiver configured to operate according to the NR standard. The processing circuitry 330 controls the overall operation of the wireless device 300 according to program instructions stored in memory 340. The processing circuitry 330 may comprise one or more microprocessors, hardware, firmware, or a combination thereof. The processing circuitry 330 is configured by a computer program 350 to perform the method shown in FIG. 4. The processing circuitry 330 is configured to receive downlink control information (DCI) from an access node, the downlink control information including an indication to suspend control channel monitoring for a suspension interval. The processing circuitry 330 is further configured to determine an delay and, following a delay period indicated by the delay and in response to the indication, to suspend control channel monitoring for the suspension interval.

Memory 340 comprises both volatile and non-volatile memory for storing computer program code and data needed by the processing circuitry 330 for operation. Memory 340 may comprise any tangible, non-transitory computer-readable storage medium for storing data including electronic, magnetic, optical, electromagnetic, or semiconductor data storage. Memory 340 stores a computer program 350 comprising executable instructions that configure the processing circuitry 330 to implement the method 100 according to FIG. 4 as described herein. A computer program 350 in this regard may comprise one or more code modules corresponding to the means or units described above. In general, computer program instructions and configuration information are stored in a non-volatile memory, such as a ROM, erasable programmable read only memory (EPROM) or flash memory. Temporary data generated during operation may be stored in a volatile memory, such as a random access memory (RAM). In some embodiments, computer program 350 for configuring the processing circuitry 330 as herein described may be stored in a removable memory, such as a portable compact disc, portable digital video disc, or other removable media. The computer program 350 may also be embodied in a carrier such as an electronic signal, optical signal, radio signal, or computer readable storage medium.

Figure 9:
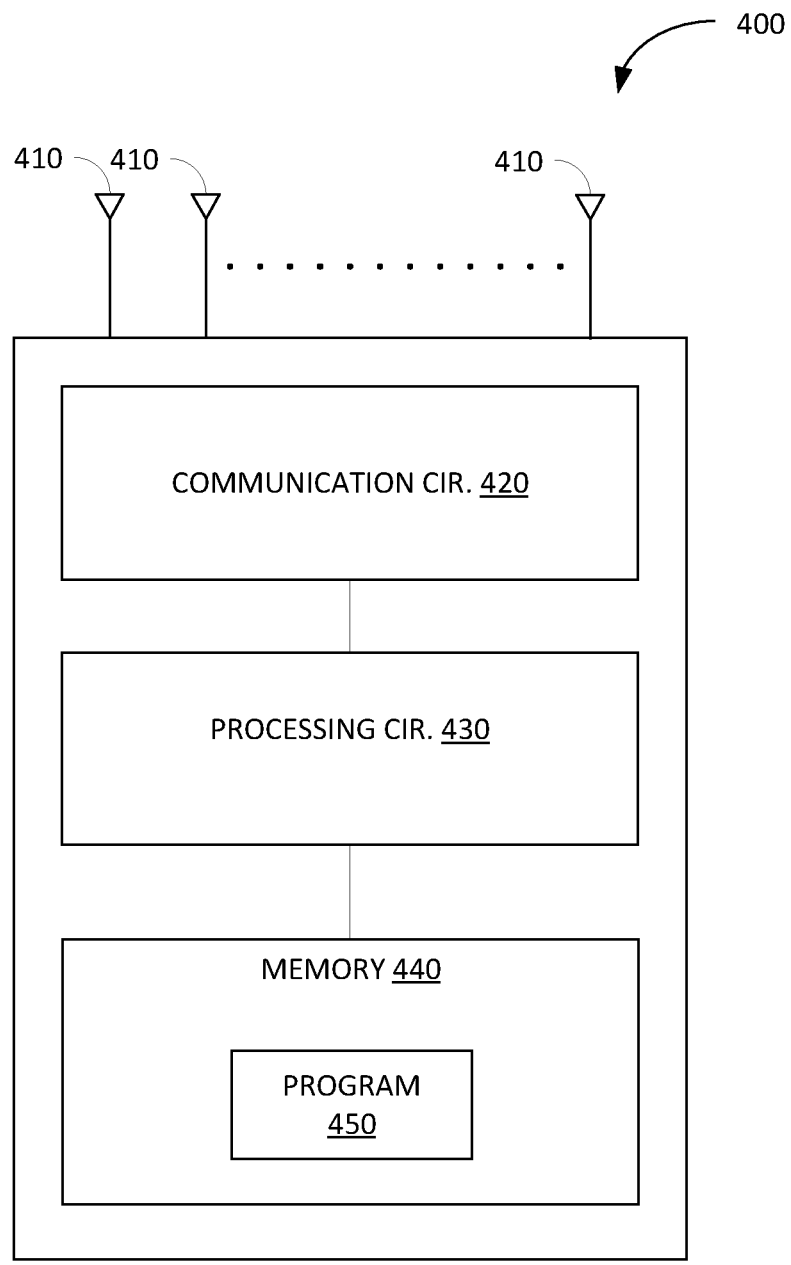
FIG. 9 illustrates an exemplary access node configured to suspend transmission of DCI when PDCCH monitoring is suspended.

FIG. 9 illustrates an access node 400 configured to suspend transmission of DCI to a wireless device 30 that has suspended PDCCH monitoring. The access node 400 comprises communication circuitry 420 for communicating with a wireless device 30 in a wireless communication network, processing circuitry 430 and memory 440.

The communication circuitry 420 is coupled to one or more antennas 410 and comprises the radio frequency (RF) circuitry for transmitting and receiving signals over a wireless communication channel. In one exemplary embodiment, the communication circuitry comprises a transmitter and receiver configured to operate according to the NR standard.

The processing circuitry 430 controls the overall operation of the access node 400 according to program instructions stored in memory 430. The processing circuitry 430 may comprise one or more microprocessors, hardware, firmware, or a combination thereof. The processing circuitry 430 is configured by a computer program 450 to perform the method shown in FIG. 5. The processing circuitry 430 is configured to transmit downlink control information (DCI) to a wireless device, the downlink control information including an indication to suspend control channel monitoring for a suspension interval. The processing circuitry 430 is further configured to determine an delay and, following a delay period indicated by the delay, suspend transmission of downlink control information to the wireless device for the suspension interval.

Memory 440 comprises both volatile and non-volatile memory for storing computer program code and data needed by the processing circuitry 430 for operation. Memory 440 may comprise any tangible, non-transitory computer-readable storage medium for storing data including electronic, magnetic, optical, electromagnetic, or semiconductor data storage. Memory 440 stores a computer program 450 comprising executable instructions that configure the processing circuitry 430 to implement the method 200 according to FIG. 5 as described herein. A computer program 450 in this regard may comprise one or more code modules corresponding to the means or units described above. In general, computer program instructions and configuration information are stored in a non-volatile memory, such as a ROM, erasable programmable read only memory (EPROM) or flash memory. Temporary data generated during operation may be stored in a volatile memory, such as a random access memory (RAM). In some embodiments, computer program 450 for configuring the processing circuitry 430 as herein described may be stored in a removable memory, such as a portable compact disc, portable digital video disc, or other removable media. The computer program 450 may also be embodied in a carrier such as an electronic signal, optical signal, radio signal, or computer readable storage medium.

Those skilled in the art will also appreciate that embodiments herein further include corresponding computer programs. A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

Figure 10:
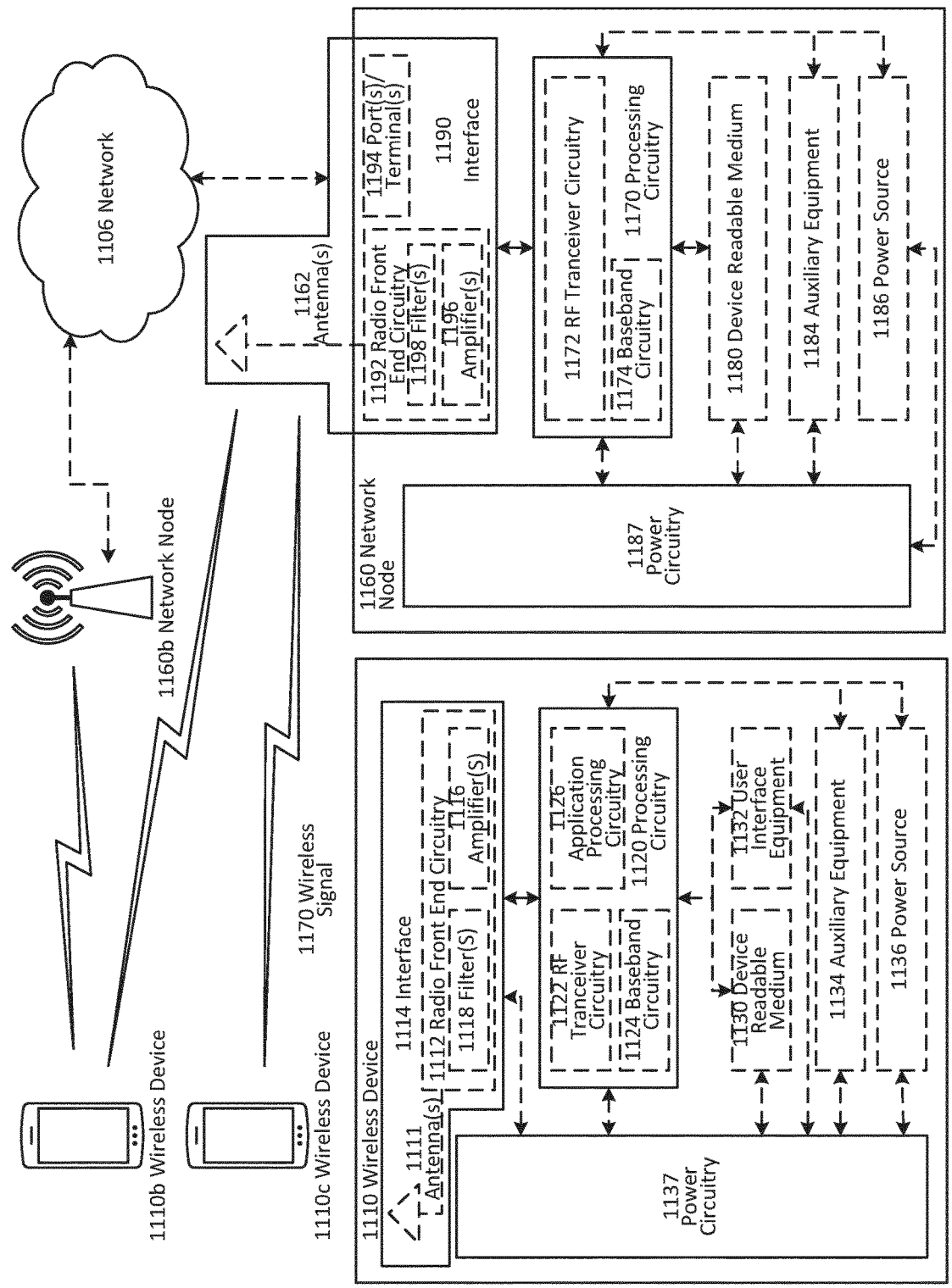
FIG. 10 is a schematic block diagram illustrating an example wireless network, according to particular embodiments of the present disclosure.

Although the subject matter described herein may be implemented in any appropriate type of system using any suitable components, the embodiments disclosed herein are described in relation to a wireless network, such as the example wireless network illustrated in FIG. 10. For simplicity, the wireless network of FIG. 10 only depicts network 1106, network nodes 1160 and 1160b, and WDs 1110, 1110b, and 1110c. In practice, a wireless network may further include any additional elements suitable to support communication between wireless devices or between a wireless device and another communication device, such as a landline telephone, a service provider, or any other network node or end device. Of the illustrated components, network node 1160 and wireless device (WD) 1110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1160 and WD 1110 comprise various components described in more detail below. These components work together in order to provide network node and/or wireless device functionality, such as providing wireless connections in a wireless network. In different embodiments, the wireless network may comprise any number of wired or wireless networks, network nodes, access nodes, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), access nodes (BSs) (e.g., radio access nodes, Node Bs, evolved Node Bs (eNBs) and NR NodeBs (gNBs)). Access nodes may be categorized based on the amount of coverage they provide (or, stated differently, their transmit power level) and may then also be referred to as femto access nodes, pico access nodes, micro access nodes, or macro access nodes. An access node may be a relay node or a relay donor node controlling a relay. A network node may also include one or more (or all) parts of a distributed radio access node such as centralized digital units and/or remote radio units (RRUs), sometimes referred to as Remote Radio Heads (RRHs). Such remote radio units may or may not be integrated with an antenna as an antenna integrated radio. Parts of a distributed radio access node may also be referred to as nodes in a distributed antenna system (DAS). Yet further examples of network nodes include multi-standard radio (MSR) equipment such as MSR BSs, network controllers such as radio network controllers (RNCs) or access node controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, network node 1160 includes processing circuitry 1170, device readable medium 1180, interface 1190, auxiliary equipment 1184, power source 1186, power circuitry 1187, and antenna 1162. Although network node 1160 illustrated in the example wireless network of FIG. 10 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1160 are depicted as single boxes located within a larger box, or nested within multiple boxes, in practice, a network node may comprise multiple different physical components that make up a single illustrated component (e.g., device readable medium 1180 may comprise multiple separate hard drives as well as multiple RAM modules).

Similarly, network node 1160 may be composed of multiple physically separate components (e.g., a NodeB component and a RNC component, or a BTS component and a BSC component, etc.), which may each have their own respective components. In certain scenarios in which network node 1160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1160 may be configured to support multiple radio access technologies (RATs). In such embodiments, some components may be duplicated (e.g., separate device readable medium 1180 for the different RATs) and some components may be reused (e.g., the same antenna 1162 may be shared by the RATs).

Network node 1160 may also include multiple sets of the various illustrated components for different wireless technologies integrated into network node 1160, such as, for example, GSM, WCDMA, LTE, NR, WiFi, or Bluetooth wireless technologies. These wireless technologies may be integrated into the same or different chip or set of chips and other components within network node 1160.

Processing circuitry 1170 is configured to perform any determining, calculating, or similar operations (e.g., certain obtaining operations) described herein as being provided by a network node. These operations performed by processing circuitry 1170 may include processing information obtained by processing circuitry 1170 by, for example, converting the obtained information into other information, comparing the obtained information or converted information to information stored in the network node, and/or performing one or more operations based on the obtained information or converted information, and as a result of said processing making a determination.

Processing circuitry 1170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1160 components, such as device readable medium 1180, network node 1160 functionality. For example, processing circuitry 1170 may execute instructions stored in device readable medium 1180 or in memory within processing circuitry 1170. Such functionality may include providing any of the various wireless features, functions, or benefits discussed herein. In some embodiments, processing circuitry 1170 may include a system on a chip (SOC).

In some embodiments, processing circuitry 1170 may include one or more of radio frequency (RF) transceiver circuitry 1172 and baseband processing circuitry 1174. In some embodiments, radio frequency (RF) transceiver circuitry 1172 and baseband processing circuitry 1174 may be on separate chips (or sets of chips), boards, or units, such as radio units and digital units. In alternative embodiments, part or all of RF transceiver circuitry 1172 and baseband processing circuitry 1174 may be on the same chip or set of chips, boards, or units In certain embodiments, some or all of the functionality described herein as being provided by a network node, access node, eNB or other such network device may be performed by processing circuitry 1170 executing instructions stored on device readable medium 1180 or memory within processing circuitry 1170. In alternative embodiments, some or all of the functionality may be provided by processing circuitry 1170 without executing instructions stored on a separate or discrete device readable medium, such as in a hard-wired manner. In any of those embodiments, whether executing instructions stored on a device readable storage medium or not, processing circuitry 1170 can be configured to perform the described functionality. The benefits provided by such functionality are not limited to processing circuitry 1170 alone or to other components of network node 1160, but are enjoyed by network node 1160 as a whole, and/or by end users and the wireless network generally.

Device readable medium 1180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1170. Device readable medium 1180 may store any suitable instructions, data or information, including a computer program, software, an application including one or more of logic, rules, code, tables, etc. and/or other instructions capable of being executed by processing circuitry 1170 and, utilized by network node 1160. Device readable medium 1180 may be used to store any calculations made by processing circuitry 1170 and/or any data received via interface 1190. In some embodiments, processing circuitry 1170 and device readable medium 1180 may be considered to be integrated.

Interface 1190 is used in the wired or wireless communication of signalling and/or data between network node 1160, network 1106, and/or WDs 1110. As illustrated, interface 1190 comprises port(s)/terminal(s) 1194 to send and receive data, for example to and from network 1106 over a wired connection. Interface 1190 also includes radio front end circuitry 1192 that may be coupled to, or in certain embodiments a part of, antenna 1162. Radio front end circuitry 1192 comprises filters 1198 and amplifiers 1196. Radio front end circuitry 1192 may be connected to antenna 1162 and processing circuitry 1170. Radio front end circuitry may be configured to condition signals communicated between antenna 1162 and processing circuitry 1170. Radio front end circuitry 1192 may receive digital data that is to be sent out to other network nodes or WDs via a wireless connection. Radio front end circuitry 1192 may convert the digital data into a radio signal having the appropriate channel and bandwidth parameters using a combination of filters 1198 and/or amplifiers 1196. The radio signal may then be transmitted via antenna 1162. Similarly, when receiving data, antenna 1162 may collect radio signals which are then converted into digital data by radio front end circuitry 1192. The digital data may be passed to processing circuitry 1170. In other embodiments, the interface may comprise different components and/or different combinations of components.

In certain alternative embodiments, network node 1160 may not include separate radio front end circuitry 1192, instead, processing circuitry 1170 may comprise radio front end circuitry and may be connected to antenna 1162 without separate radio front end circuitry 1192. Similarly, in some embodiments, all or some of RF transceiver circuitry 1172 may be considered a part of interface 1190. In still other embodiments, interface 1190 may include one or more ports or terminals 1194, radio front end circuitry 1192, and RF transceiver circuitry 1172, as part of a radio unit (not shown), and interface 1190 may communicate with baseband processing circuitry 1174, which is part of a digital unit (not shown).

Antenna 1162 may include one or more antennas, or antenna arrays, configured to send and/or receive wireless signals. Antenna 1162 may be coupled to radio front end circuitry 1190 and may be any type of antenna capable of transmitting and receiving data and/or signals wirelessly. In some embodiments, antenna 1162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1162 may be separate from network node 1160 and may be connectable to network node 1160 through an interface or port.

Antenna 1162, interface 1190, and/or processing circuitry 1170 may be configured to perform any receiving operations and/or certain obtaining operations described herein as being performed by a network node. Any information, data and/or signals may be received from a wireless device, another network node and/or any other network equipment. Similarly, antenna 1162, interface 1190, and/or processing circuitry 1170 may be configured to perform any transmitting operations described herein as being performed by a network node. Any information, data and/or signals may be transmitted to a wireless device, another network node and/or any other network equipment.

Power circuitry 1187 may comprise, or be coupled to, power management circuitry and is configured to supply the components of network node 1160 with power for performing the functionality described herein. Power circuitry 1187 may receive power from power source 1186. Power source 1186 and/or power circuitry 1187 may be configured to provide power to the various components of network node 1160 in a form suitable for the respective components (e.g., at a voltage and current level needed for each respective component). Power source 1186 may either be included in, or external to, power circuitry 1187 and/or network node 1160. For example, network node 1160 may be connectable to an external power source (e.g., an electricity outlet) via an input circuitry or interface such as an electrical cable, whereby the external power source supplies power to power circuitry 1187. As a further example, power source 1186 may comprise a source of power in the form of a battery or battery pack which is connected to, or integrated in, power circuitry 1187. The battery may provide backup power should the external power source fail. Other types of power sources, such as photovoltaic devices, may also be used.

Alternative embodiments of network node 1160 may include additional components beyond those shown in FIG. 10 that may be responsible for providing certain aspects of the network node's functionality, including any of the functionality described herein and/or any functionality necessary to support the subject matter described herein. For example, network node 1160 may include user interface equipment to allow input of information into network node 1160 and to allow output of information from network node 1160. This may allow a user to perform diagnostic, maintenance, repair, and other administrative functions for network node 1160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1110 includes antenna 1111, interface 1114, processing circuitry 1120, device readable medium 1130, user interface equipment 1132, auxiliary equipment 1134, power source 1136 and power circuitry 1137. WD 1110 may include multiple sets of one or more of the illustrated components for different wireless technologies supported by WD 1110, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1110.

Antenna 1111 may include one or more antennas or antenna arrays, configured to send and/or receive wireless signals, and is connected to interface 1114. In certain alternative embodiments, antenna 1111 may be separate from WD 1110 and be connectable to WD 1110 through an interface or port. Antenna 1111, interface 1114, and/or processing circuitry 1120 may be configured to perform any receiving or transmitting operations described herein as being performed by a WD. Any information, data and/or signals may be received from a network node and/or another WD. In some embodiments, radio front end circuitry and/or antenna 1111 may be considered an interface.

As illustrated, interface 1114 comprises radio front end circuitry 1112 and antenna 1111. Radio front end circuitry 1112 comprise one or more filters 1118 and amplifiers 1116. Radio front end circuitry 1114 is connected to antenna 1111 and processing circuitry 1120, and is configured to condition signals communicated between antenna 1111 and processing circuitry 1120. Radio front end circuitry 1112 may be coupled to or a part of antenna 1111. In some embodiments, WD 1110 may not include separate radio front end circuitry 1112; rather, processing circuitry 1120 may comprise radio front end circuitry and may be connected to antenna 1111. Similarly, in some embodiments, some or all of RF transceiver circuitry 1122 may be considered a part of interface 1114. Radio front end circuitry 1112 may receive digital data that is to be sent out to other network nodes or WDs via a wireless connection. Radio front end circuitry 1112 may convert the digital data into a radio signal having the appropriate channel and bandwidth parameters using a combination of filters 1118 and/or amplifiers 1116. The radio signal may then be transmitted via antenna 1111. Similarly, when receiving data, antenna 1111 may collect radio signals which are then converted into digital data by radio front end circuitry 1112. The digital data may be passed to processing circuitry 1120. In other embodiments, the interface may comprise different components and/or different combinations of components.

Processing circuitry 1120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1110 components, such as device readable medium 1130, WD 1110 functionality. Such functionality may include providing any of the various wireless features or benefits discussed herein. For example, processing circuitry 1120 may execute instructions stored in device readable medium 1130 or in memory within processing circuitry 1120 to provide the functionality disclosed herein.

As illustrated, processing circuitry 1120 includes one or more of RF transceiver circuitry 1122, baseband processing circuitry 1124, and application processing circuitry 1126. In other embodiments, the processing circuitry may comprise different components and/or different combinations of components. In certain embodiments processing circuitry 1120 of WD 1110 may comprise a SOC. In some embodiments, RF transceiver circuitry 1122, baseband processing circuitry 1124, and application processing circuitry 1126 may be on separate chips or sets of chips. In alternative embodiments, part or all of baseband processing circuitry 1124 and application processing circuitry 1126 may be combined into one chip or set of chips, and RF transceiver circuitry 1122 may be on a separate chip or set of chips. In still alternative embodiments, part or all of RF transceiver circuitry 1122 and baseband processing circuitry 1124 may be on the same chip or set of chips, and application processing circuitry 1126 may be on a separate chip or set of chips. In yet other alternative embodiments, part or all of RF transceiver circuitry 1122, baseband processing circuitry 1124, and application processing circuitry 1126 may be combined in the same chip or set of chips. In some embodiments, RF transceiver circuitry 1122 may be a part of interface 1114. RF transceiver circuitry 1122 may condition RF signals for processing circuitry 1120.

In certain embodiments, some or all of the functionality described herein as being performed by a WD may be provided by processing circuitry 1120 executing instructions stored on device readable medium 1130, which in certain embodiments may be a computer-readable storage medium. In alternative embodiments, some or all of the functionality may be provided by processing circuitry 1120 without executing instructions stored on a separate or discrete device readable storage medium, such as in a hard-wired manner. In any of those particular embodiments, whether executing instructions stored on a device readable storage medium or not, processing circuitry 1120 can be configured to perform the described functionality. The benefits provided by such functionality are not limited to processing circuitry 1120 alone or to other components of WD 1110, but are enjoyed by WD 1110 as a whole, and/or by end users and the wireless network generally.

Processing circuitry 1120 may be configured to perform any determining, calculating, or similar operations (e.g., certain obtaining operations) described herein as being performed by a WD. These operations, as performed by processing circuitry 1120, may include processing information obtained by processing circuitry 1120 by, for example, converting the obtained information into other information, comparing the obtained information or converted information to information stored by WD 1110, and/or performing one or more operations based on the obtained information or converted information, and as a result of said processing making a determination.

Device readable medium 1130 may be operable to store a computer program, software, an application including one or more of logic, rules, code, tables, etc. and/or other instructions capable of being executed by processing circuitry 1120. Device readable medium 1130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1120. In some embodiments, processing circuitry 1120 and device readable medium 1130 may be considered to be integrated.

User interface equipment 1132 may provide components that allow for a human user to interact with WD 1110. Such interaction may be of many forms, such as visual, audial, tactile, etc. User interface equipment 1132 may be operable to produce output to the user and to allow the user to provide input to WD 1110. The type of interaction may vary depending on the type of user interface equipment 1132 installed in WD 1110. For example, if WD 1110 is a smart phone, the interaction may be via a touch screen; if WD 1110 is a smart meter, the interaction may be through a screen that provides usage (e.g., the number of gallons used) or a speaker that provides an audible alert (e.g., if smoke is detected). User interface equipment 1132 may include input interfaces, devices and circuits, and output interfaces, devices and circuits. User interface equipment 1132 is configured to allow input of information into WD 1110, and is connected to processing circuitry 1120 to allow processing circuitry 1120 to process the input information. User interface equipment 1132 may include, for example, a microphone, a proximity or other sensor, keys/buttons, a touch display, one or more cameras, a USB port, or other input circuitry. User interface equipment 1132 is also configured to allow output of information from WD 1110, and to allow processing circuitry 1120 to output information from WD 1110. User interface equipment 1132 may include, for example, a speaker, a display, vibrating circuitry, a USB port, a headphone interface, or other output circuitry. Using one or more input and output interfaces, devices, and circuits, of user interface equipment 1132, WD 1110 may communicate with end users and/or the wireless network, and allow them to benefit from the functionality described herein.

Auxiliary equipment 1134 is operable to provide more specific functionality which may not be generally performed by WDs. This may comprise specialized sensors for doing measurements for various purposes, interfaces for additional types of communication such as wired communications etc. The inclusion and type of components of auxiliary equipment 1134 may vary depending on the embodiment and/or scenario.

Power source 1136 may, in some embodiments, be in the form of a battery or battery pack. Other types of power sources, such as an external power source (e.g., an electricity outlet), photovoltaic devices or power cells, may also be used. WD 1110 may further comprise power circuitry 1137 for delivering power from power source 1136 to the various parts of WD 1110 which need power from power source 1136 to carry out any functionality described or indicated herein. Power circuitry 1137 may in certain embodiments comprise power management circuitry. Power circuitry 1137 may additionally or alternatively be operable to receive power from an external power source; in which case WD 1110 may be connectable to the external power source (such as an electricity outlet) via input circuitry or an interface such as an electrical power cable. Power circuitry 1137 may also in certain embodiments be operable to deliver power from an external power source to power source 1136. This may be, for example, for the charging of power source 1136. Power circuitry 1137 may perform any formatting, converting, or other modification to the power from power source 1136 to make the power suitable for the respective components of WD 1110 to which power is supplied.

Figure 11:
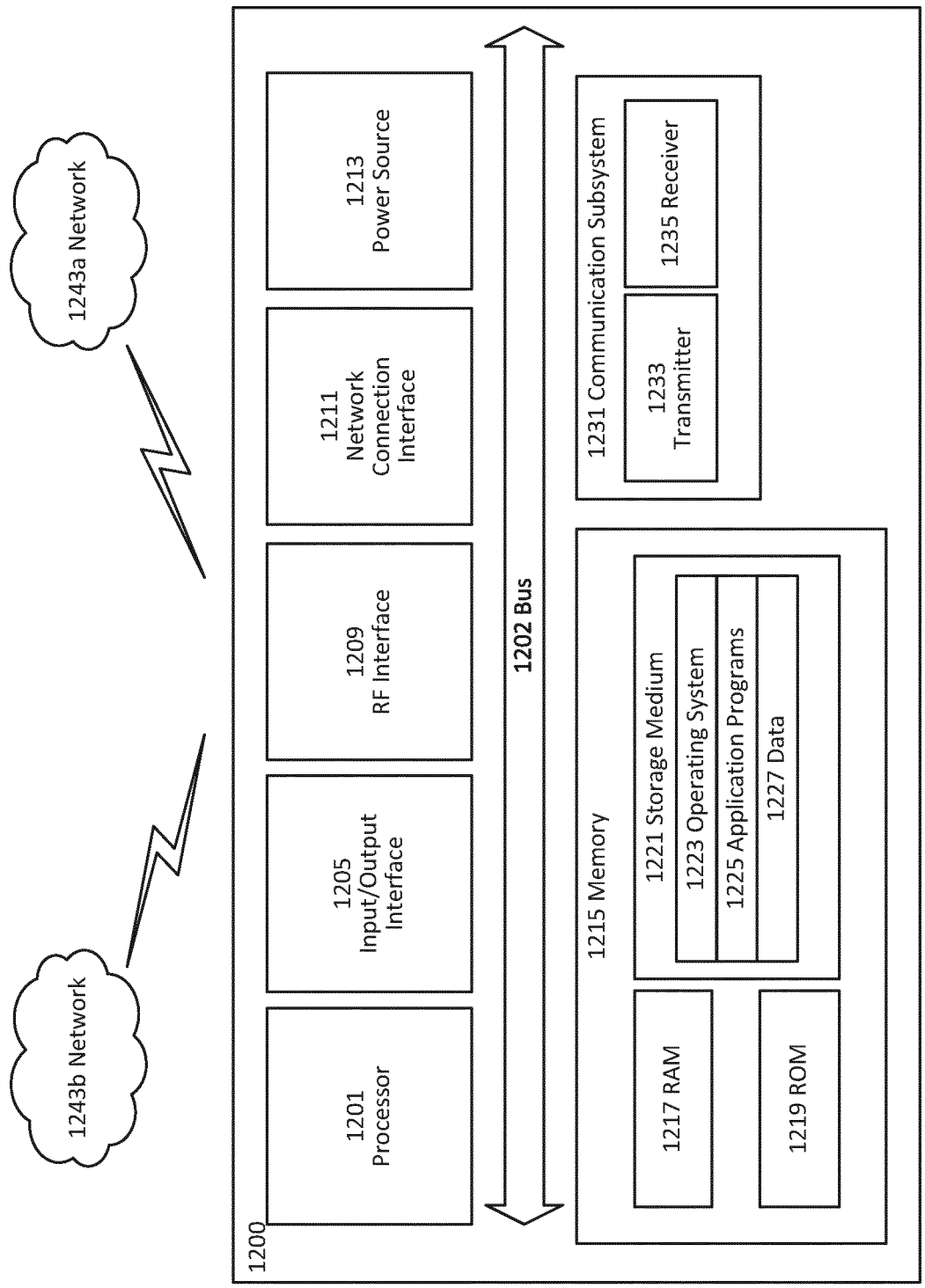
FIG. 11 is a schematic block diagram illustrating an example of a user equipment, according to particular embodiments of the present disclosure.

FIG. 11 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1200 may be any UE identified by the 3rd Generation Partnership Project (3GPP), including a NB-IoT UE, a machine type communication (MTC) UE, and/or an enhanced MTC (eMTC) UE. UE 1200, as illustrated in FIG. 11, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 11, UE 1200 includes processing circuitry 1201 that is operatively coupled to input/output interface 1205, radio frequency (RF) interface 1209, network connection interface 1211, memory 1215 including random access memory (RAM) 1217, read-only memory (ROM) 1219, and storage medium 1221 or the like, communication subsystem 1231, power source 1233, and/or any other component, or any combination thereof. Storage medium 1221 includes operating system 1223, application program 1225, and data 1227. In other embodiments, storage medium 1221 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry 1201 may be configured to process computer instructions and data. Processing circuitry 1201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1201 may include two central processing units (CPUs). Data may be information in a form suitable for use by a computer.

In the depicted embodiment, input/output interface 1205 may be configured to provide a communication interface to an input device, output device, or input and output device. UE 1200 may be configured to use an output device via input/output interface 1205. An output device may use the same type of interface port as an input device. For example, a USB port may be used to provide input to and output from UE 1200. The output device may be a speaker, a sound card, a video card, a display, a monitor, a printer, an actuator, an emitter, a smartcard, another output device, or any combination thereof. UE 1200 may be configured to use an input device via input/output interface 1205 to allow a user to capture information into UE 1200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface 1209 may be configured to provide a communication interface to RF components such as a transmitter, a receiver, and an antenna. Network connection interface 1211 may be configured to provide a communication interface to network 1243a. Network 1243a may encompass wired and/or wireless networks such as a local-area network (LAN), a wide-area network (WAN), a computer network, a wireless network, a telecommunications network, another like network or any combination thereof. For example, network 1243a may comprise a Wi-Fi network. Network connection interface 1211 may be configured to include a receiver and a transmitter interface used to communicate with one or more other devices over a communication network according to one or more communication protocols, such as Ethernet, TCP/IP, SONET, ATM, or the like. Network connection interface 1211 may implement receiver and transmitter functionality appropriate to the communication network links (e.g., optical, electrical, and the like). The transmitter and receiver functions may share circuit components, software or firmware, or alternatively may be implemented separately.

RAM 1217 may be configured to interface via bus 1202 to processing circuitry 1201 to provide storage or caching of data or computer instructions during the execution of software programs such as the operating system, application programs, and device drivers. ROM 1219 may be configured to provide computer instructions or data to processing circuitry 1201. For example, ROM 1219 may be configured to store invariant low-level system code or data for basic system functions such as basic input and output (I/O), startup, or reception of keystrokes from a keyboard that are stored in a non-volatile memory. Storage medium 1221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1221 may be configured to include operating system 1223, application program 1225 such as a web browser application, a widget or gadget engine or another application, and data file 1227. Storage medium 1221 may store, for use by UE 1200, any of a variety of various operating systems or combinations of operating systems.

Storage medium 1221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1221 may allow UE 1200 to access computer-executable instructions, application programs or the like, stored on transitory or non-transitory memory media, to off-load data, or to upload data. An article of manufacture, such as one utilizing a communication system may be tangibly embodied in storage medium 1221, which may comprise a device readable medium.

In FIG. 11, processing circuitry 1201 may be configured to communicate with network 1243b using communication subsystem 1231. Network 1243a and network 1243b may be the same network or networks or different network or networks. Communication subsystem 1231 may be configured to include one or more transceivers used to communicate with network 1243b. For example, communication subsystem 1231 may be configured to include one or more transceivers used to communicate with one or more remote transceivers of another device capable of wireless communication such as another WD, UE, or access node of a radio access network (RAN) according to one or more communication protocols, such as IEEE 802.11, CDMA, WCDMA, GSM, LTE, UTRAN, WiMax, or the like. Each transceiver may include transmitter 1233 and/or receiver 1235 to implement transmitter or receiver functionality, respectively, appropriate to the RAN links (e.g., frequency allocations and the like). Further, transmitter 1233 and receiver 1235 of each transceiver may share circuit components, software or firmware, or alternatively may be implemented separately.

In the illustrated embodiment, the communication functions of communication subsystem 1231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1231 may include cellular communication, Wi-Fi communication, Bluetooth communication, and GPS communication. Network 1243b may encompass wired and/or wireless networks such as a local-area network (LAN), a wide-area network (WAN), a computer network, a wireless network, a telecommunications network, another like network or any combination thereof. For example, network 1243*b* may be a cellular network, a Wi-Fi network, and/or a near-field network. Power source 1213 may be configured to provide alternating current (AC) or direct current (DC) power to components of UE 1200.

The features, benefits and/or functions described herein may be implemented in one of the components of UE 1200 or partitioned across multiple components of UE 1200. Further, the features, benefits, and/or functions described herein may be implemented in any combination of hardware, software or firmware. In one example, communication subsystem 1231 may be configured to include any of the components described herein. Further, processing circuitry 1201 may be configured to communicate with any of such components over bus 1202. In another example, any of such components may be represented by program instructions stored in memory that when executed by processing circuitry 1201 perform the corresponding functions described herein. In another example, the functionality of any of such components may be partitioned between processing circuitry 1201 and communication subsystem 1231. In another example, the non-computationally intensive functions of any of such components may be implemented in software or firmware and the computationally intensive functions may be implemented in hardware.

Figure 12:
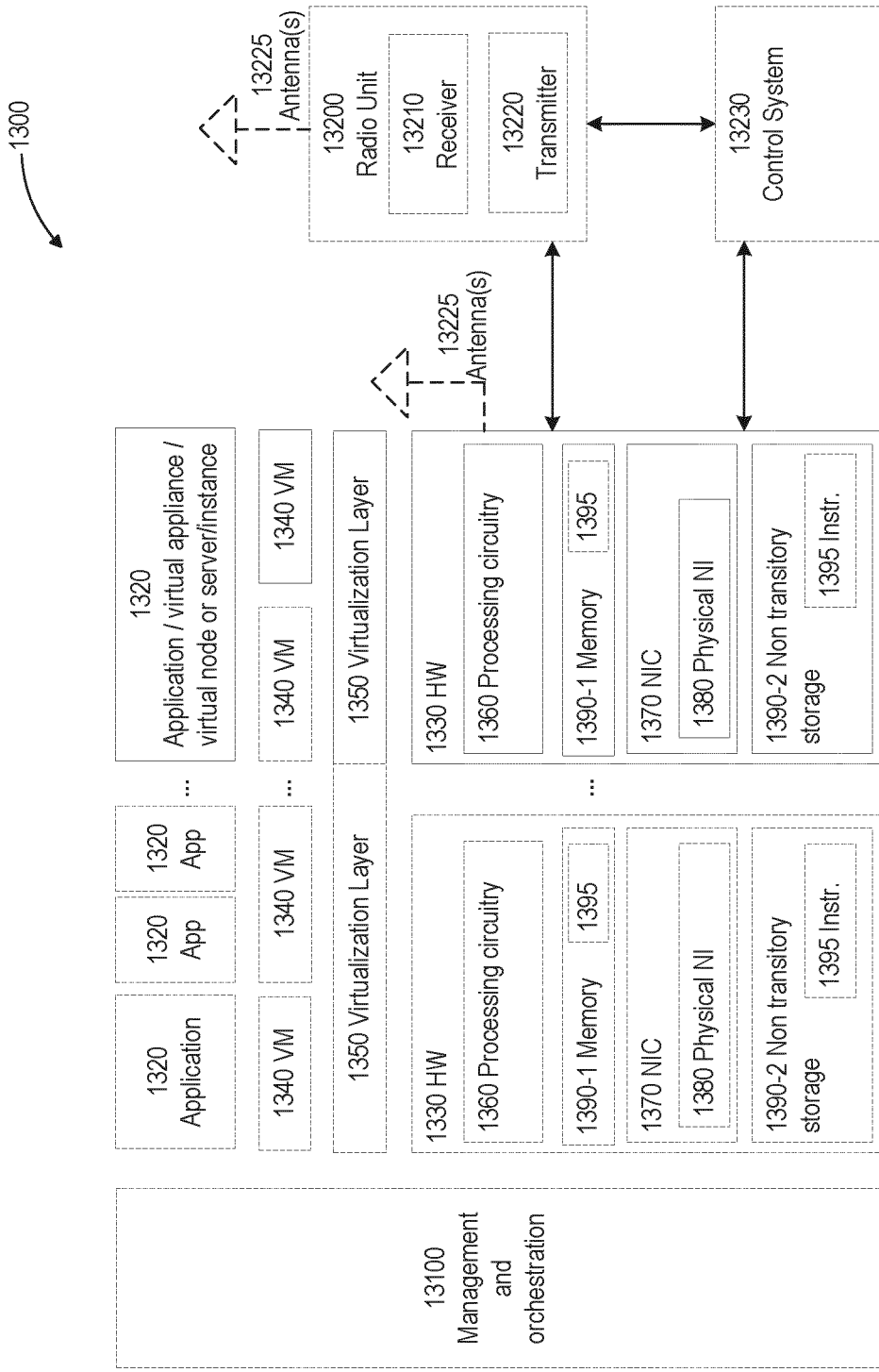
FIG. 12 is a schematic block diagram illustrating an example of a virtualization environment, according to particular embodiments of the present disclosure.

FIG. 12 is a schematic block diagram illustrating a virtualization environment 1300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized access node or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1300 hosted by one or more of hardware nodes 1330. Further, in embodiments in which the virtual node is not a radio access node or does not require radio connectivity (e.g., a core network node), then the network node may be entirely virtualized.

The functions may be implemented by one or more applications 1320 (which may alternatively be called software instances, virtual appliances, network functions, virtual nodes, virtual network functions, etc.) operative to implement some of the features, functions, and/or benefits of some of the embodiments disclosed herein. Applications 1320 are run in virtualization environment 1300 which provides hardware 1330 comprising processing circuitry 1360 and memory 1390. Memory 1390 contains instructions 1395 executable by processing circuitry 1360 whereby application 1320 is operative to provide one or more of the features, benefits, and/or functions disclosed herein.

Virtualization environment 1300, comprises general-purpose or special-purpose network hardware devices 1330 comprising a set of one or more processors or processing circuitry 1360, which may be commercial off-the-shelf (COTS) processors, dedicated Application Specific Integrated Circuits (ASICs), or any other type of processing circuitry including digital or analog hardware components or special purpose processors. Each hardware device may comprise memory 1390-1 which may be non-persistent memory for temporarily storing instructions 1395 or software executed by processing circuitry 1360. Each hardware device may comprise one or more network interface controllers (NICs) 1370, also known as network interface cards, which include physical network interface 1380. Each hardware device may also include non-transitory, persistent, machine-readable storage media 1390-2 having stored therein software 1395 and/or instructions executable by processing circuitry 1360. Software 1395 may include any type of software including software for instantiating one or more virtualization layers 1350 (also referred to as hypervisors), software to execute virtual machines 1340 as well as software allowing it to execute functions, features and/or benefits described in relation with some embodiments described herein.

Virtual machines 1340, comprise virtual processing, virtual memory, virtual networking or interface and virtual storage, and may be run by a corresponding virtualization layer 1350 or hypervisor. Different embodiments of the instance of virtual appliance 1320 may be implemented on one or more of virtual machines 1340, and the implementations may be made in different ways.

During operation, processing circuitry 1360 executes software 1395 to instantiate the hypervisor or virtualization layer 1350, which may sometimes be referred to as a virtual machine monitor (VMM). Virtualization layer 1350 may present a virtual operating platform that appears like networking hardware to virtual machine 1340.

As shown in FIG. 12, hardware 1330 may be a standalone network node with generic or specific components. Hardware 1330 may comprise antenna 13225 and may implement some functions via virtualization. Alternatively, hardware 1330 may be part of a larger cluster of hardware (e.g. such as in a data center or customer premise equipment (CPE)) where many hardware nodes work together and are managed via management and orchestration (MANO) 13100, which, among others, oversees lifecycle management of applications 1320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1340 may be a software implementation of a physical machine that runs programs as if they were executing on a physical, non-virtualized machine. Each of virtual machines 1340, and that part of hardware 1330 that executes that virtual machine, be it hardware dedicated to that virtual machine and/or hardware shared by that virtual machine with others of the virtual machines 1340, forms a separate virtual network elements (VNE).

Still in the context of NFV, Virtual Network Function (VNF) is responsible for handling specific network functions that run in one or more virtual machines 1340 on top of hardware networking infrastructure 1330 and corresponds to application 1320 in FIG. 12.

In some embodiments, one or more radio units 13200 that each include one or more transmitters 13220 and one or more receivers 13210 may be coupled to one or more antennas 13225. Radio units 13200 may communicate directly with hardware nodes 1330 via one or more appropriate network interfaces and may be used in combination with the virtual components to provide a virtual node with radio capabilities, such as a radio access node or an access node.

In some embodiments, some signalling can be effected with the use of control system 13230 which may alternatively be used for communication between the hardware nodes 1330 and radio units 13200.

Figure 13:
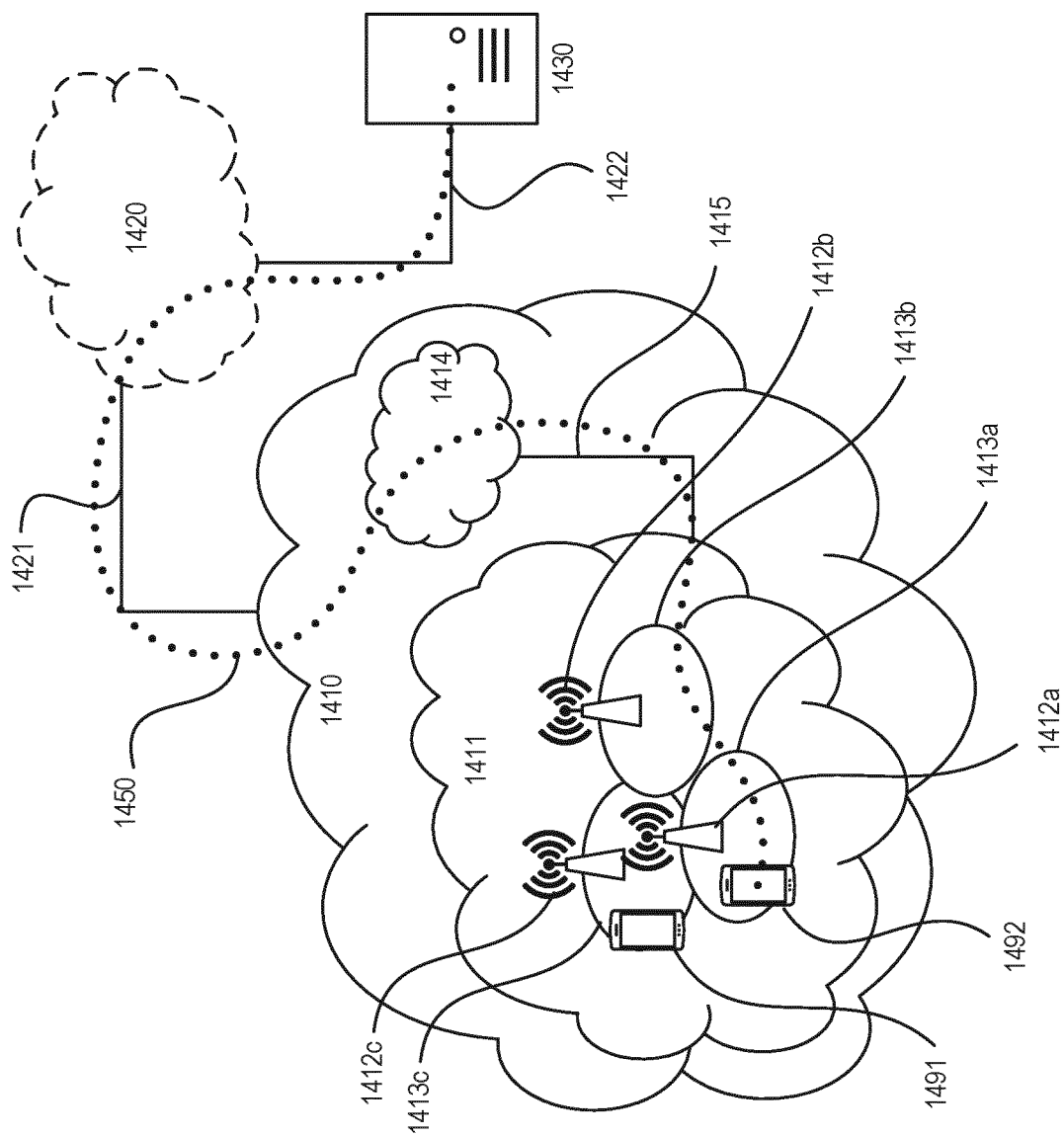
FIG. 13 is a schematic illustrating an example telecommunication network, according to particular embodiments of the present disclosure.

FIG. 13 illustrates a telecommunication network connected via an intermediate network to a host computer in accordance with some embodiments. In particular, with reference to FIG. 13, in accordance with an embodiment, a communication system includes telecommunication network 1410, such as a 3GPP-type cellular network, which comprises access network 1411, such as a radio access network, and core network 1414. Access network 1411 comprises a plurality of access nodes 1412a, 1412b, 1412c, such as NBs, eNBs, gNBs or other types of wireless access points, each defining a corresponding coverage area 1413a, 1413b, 1413c. Each access node 1412a, 1412b, 1412c is connectable to core network 1414 over a wired or wireless connection 1415. A first UE 1491 located in coverage area 1413c is configured to wirelessly connect to, or be paged by, the corresponding access node 1412c. A second UE 1492 in coverage area 1413a is wirelessly connectable to the corresponding access node 1412a. While a plurality of UEs 1491, 1492 are illustrated in this example, the disclosed embodiments are equally applicable to a situation where a sole UE is in the coverage area or where a sole UE is connecting to the corresponding access node 1412.

Telecommunication network 1410 is itself connected to host computer 1430, which may be embodied in the hardware and/or software of a standalone server, a cloud-implemented server, a distributed server or as processing resources in a server farm. Host computer 1430 may be under the ownership or control of a service provider, or may be operated by the service provider or on behalf of the service provider. Connections 1421 and 1422 between telecommunication network 1410 and host computer 1430 may extend directly from core network 1414 to host computer 1430 or may go via an optional intermediate network 1420. Intermediate network 1420 may be one of, or a combination of more than one of, a public, private or hosted network; intermediate network 1420, if any, may be a backbone network or the Internet; in particular, intermediate network 1420 may comprise two or more sub-networks (not shown).

The communication system of FIG. 13 as a whole enables connectivity between the connected UEs 1491, 1492 and host computer 1430. The connectivity may be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 may be transparent in the sense that the participating communication devices through which OTT connection 1450 passes are unaware of routing of uplink and downlink communications. For example, access node 1412 may not or need not be informed about the past routing of an incoming downlink communication with data originating from host computer 1430 to be forwarded (e.g., handed over) to a connected UE 1491. Similarly, access node 1412 need not be aware of the future routing of an outgoing uplink communication originating from the UE 1491 towards the host computer 1430.

Figure 14:
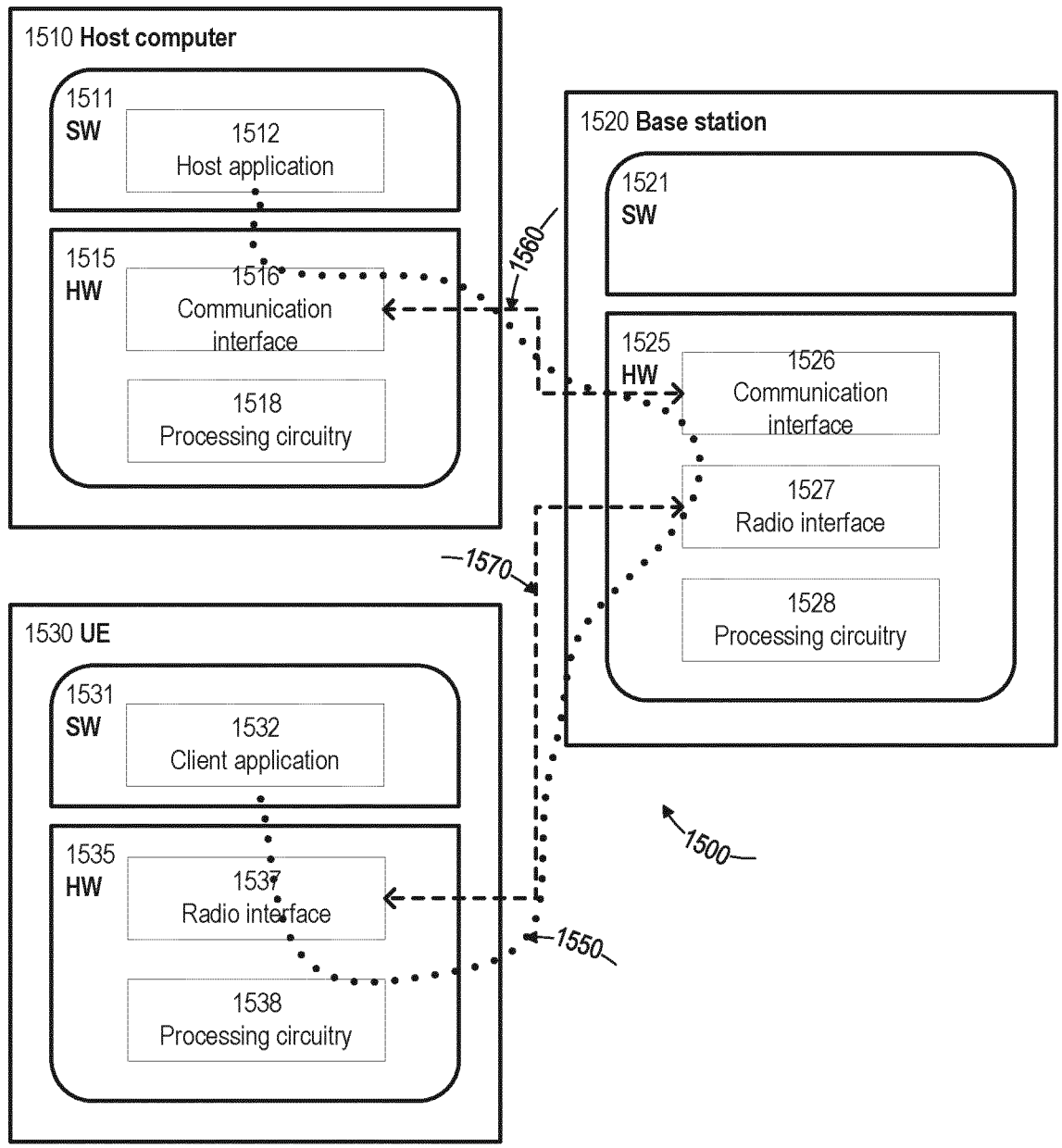
FIG. 14 is a schematic block diagram illustrating an example communication system, according to particular embodiments of the present disclosure.

Example implementations, in accordance with an embodiment, of the UE, access node and host computer discussed in the preceding paragraphs will now be described with reference to FIG. 14. FIG. 14 illustrates host computer communicating via an access node with a user equipment over a partially wireless connection in accordance with some embodiments In communication system 1500, host computer 1510 comprises hardware 1515 including communication interface 1516 configured to set up and maintain a wired or wireless connection with an interface of a different communication device of communication system 1500. Host computer 1510 further comprises processing circuitry 1518, which may have storage and/or processing capabilities. In particular, processing circuitry 1518 may comprise one or more programmable processors, application-specific integrated circuits, field programmable gate arrays or combinations of these (not shown) adapted to execute instructions. Host computer 1510 further comprises software 1511, which is stored in or accessible by host computer 1510 and executable by processing circuitry 1518. Software 1511 includes host application 1512. Host application 1512 may be operable to provide a service to a remote user, such as UE 1530 connecting via OTT connection 1550 terminating at UE 1530 and host computer 1510. In providing the service to the remote user, host application 1512 may provide user data which is transmitted using OTT connection 1550.

Communication system 1500 further includes access node 1520 provided in a telecommunication system and comprising hardware 1525 enabling it to communicate with host computer 1510 and with UE 1530. Hardware 1525 may include communication interface 1526 for setting up and maintaining a wired or wireless connection with an interface of a different communication device of communication system 1500, as well as radio interface 1527 for setting up and maintaining at least wireless connection 1570 with UE 1530 located in a coverage area (not shown in FIG. 14) served by access node 1520. Communication interface 1526 may be configured to facilitate connection 1560 to host computer 1510. Connection 1560 may be direct or it may pass through a core network (not shown in FIG. 14) of the telecommunication system and/or through one or more intermediate networks outside the telecommunication system. In the embodiment shown, hardware 1525 of access node 1520 further includes processing circuitry 1528, which may comprise one or more programmable processors, application-specific integrated circuits, field programmable gate arrays or combinations of these (not shown) adapted to execute instructions. Access node 1520 further has software 1521 stored internally or accessible via an external connection.

Communication system 1500 further includes UE 1530 already referred to. Its hardware 1535 may include radio interface 1537 configured to set up and maintain wireless connection 1570 with an access node serving a coverage area in which UE 1530 is currently located. Hardware 1535 of UE 1530 further includes processing circuitry 1538, which may comprise one or more programmable processors, application-specific integrated circuits, field programmable gate arrays or combinations of these (not shown) adapted to execute instructions. UE 1530 further comprises software 1531, which is stored in or accessible by UE 1530 and executable by processing circuitry 1538. Software 1531 includes client application 1532. Client application 1532 may be operable to provide a service to a human or nonhuman user via UE 1530, with the support of host computer 1510. In host computer 1510, an executing host application 1512 may communicate with the executing client application 1532 via OTT connection 1550 terminating at UE 1530 and host computer 1510. In providing the service to the user, client application 1532 may receive request data from host application 1512 and provide user data in response to the request data. OTT connection 1550 may transfer both the request data and the user data. Client application 1532 may interact with the user to generate the user data that it provides.

It is noted that host computer 1510, access node 1520 and UE 1530 illustrated in FIG. 14 may be similar or identical to host computer 1430, one of access nodes 1412*a*, 1412*b*, 1412*c* and one of UEs 1491, 1492 of FIG. 13, respectively. This is to say, the inner workings of these entities may be as shown in FIG. 14 and independently, the surrounding network topology may be that of FIG. 13.

In FIG. 14, OTT connection 1550 has been drawn abstractly to illustrate the communication between host computer 1510 and UE 1530 vian access node 1520, without explicit reference to any intermediary devices and the precise routing of messages via these devices. Network infrastructure may determine the routing, which it may be configured to hide from UE 1530 or from the service provider operating host computer 1510, or both. While OTT connection 1550 is active, the network infrastructure may further take decisions by which it dynamically changes the routing (e.g., on the basis of load balancing consideration or reconfiguration of the network).

Wireless connection 1570 between UE 1530 and access node 1520 is in accordance with the teachings of the embodiments described throughout this disclosure. One or more of the various embodiments improve the performance of OTT services provided to UE 1530 using OTT connection 1550, in which wireless connection 1570 forms the last segment. More precisely, the teachings of these embodiments may improve the power consumption of the wireless device and thereby provide benefits such as extended battery lifetime.

A measurement procedure may be provided for the purpose of monitoring data rate, latency and other factors on which the one or more embodiments improve. There may further be an optional network functionality for reconfiguring OTT connection 1550 between host computer 1510 and UE 1530, in response to variations in the measurement results. The measurement procedure and/or the network functionality for reconfiguring OTT connection 1550 may be implemented in software 1511 and hardware 1515 of host computer 1510 or in software 1531 and hardware 1535 of UE 1530, or both. In embodiments, sensors (not shown) may be deployed in or in association with communication devices through which OTT connection 1550 passes; the sensors may participate in the measurement procedure by supplying values of the monitored quantities exemplified above, or supplying values of other physical quantities from which software 1511, 1531 may compute or estimate the monitored quantities. The reconfiguring of OTT connection 1550 may include message format, retransmission settings, preferred routing etc.; the reconfiguring need not affect access node 1520, and it may be unknown or imperceptible to access node 1520. Such procedures and functionalities may be known and practiced in the art. In certain embodiments, measurements may involve proprietary UE signaling facilitating host computer 1510's measurements of throughput, propagation times, latency and the like. The measurements may be implemented in that software 1511 and 1531 causes messages to be transmitted, in particular empty or 'dummy' messages, using OTT connection 1550 while it monitors propagation times, errors etc.

Figure 15:
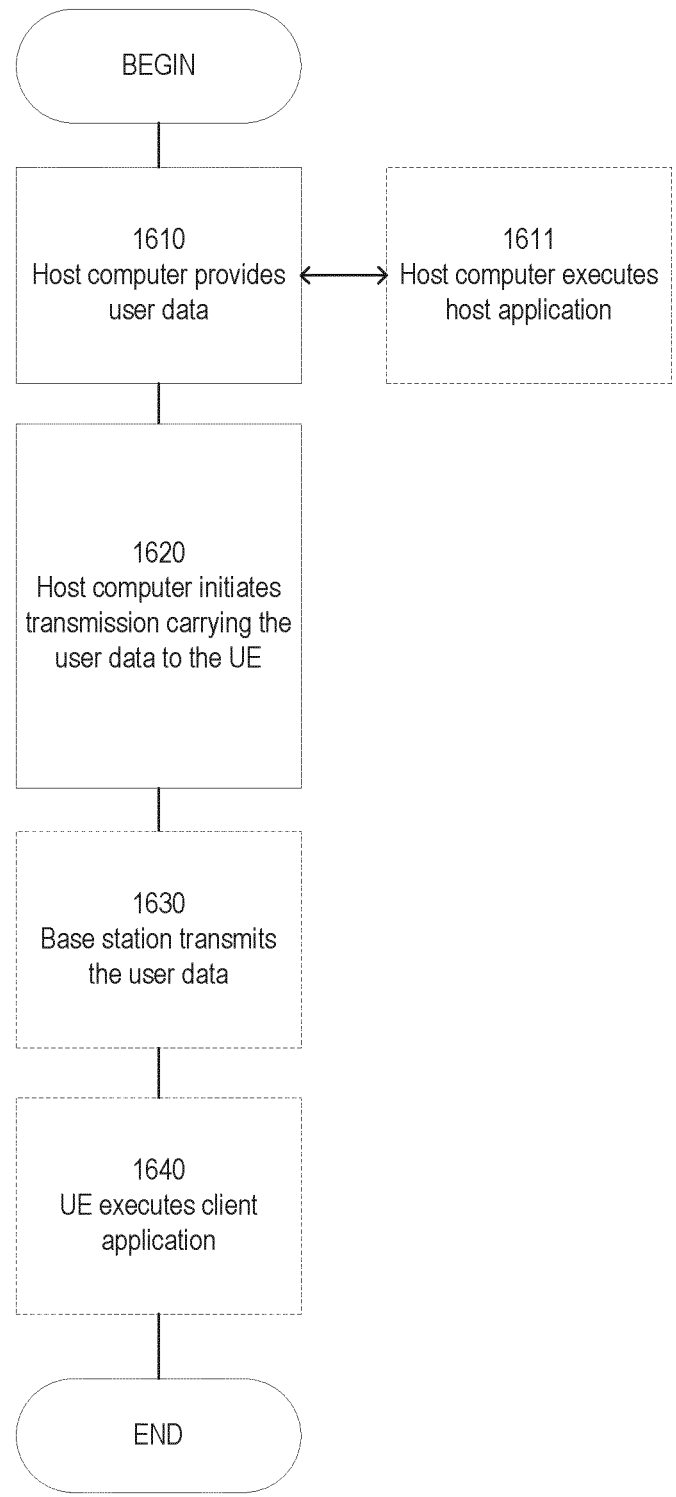
FIGS. 15-18 are flow diagrams, each of which illustrates an example method implemented in a communication system, according to particular embodiments of the present disclosure.

FIG. 15 is a flowchart illustrating a method implemented in a communication system, in accordance with one embodiment. The communication system includes a host computer, an access node and a UE which may be those described with reference to FIGS. 13 and 14. For simplicity of the present disclosure, only drawing references to FIG. 15 will be included in this section. In step 1610, the host computer provides user data. In substep 1611 (which may be optional) of step 1610, the host computer provides the user data by executing a host application. In step 1620, the host computer initiates a transmission carrying the user data to the UE. In step 1630 (which may be optional), the access node transmits to the UE the user data which was carried in the transmission that the host computer initiated, in accordance with the teachings of the embodiments described throughout this disclosure. In step 1640 (which may also be optional), the UE executes a client application associated with the host application executed by the host computer.

Figure 16:
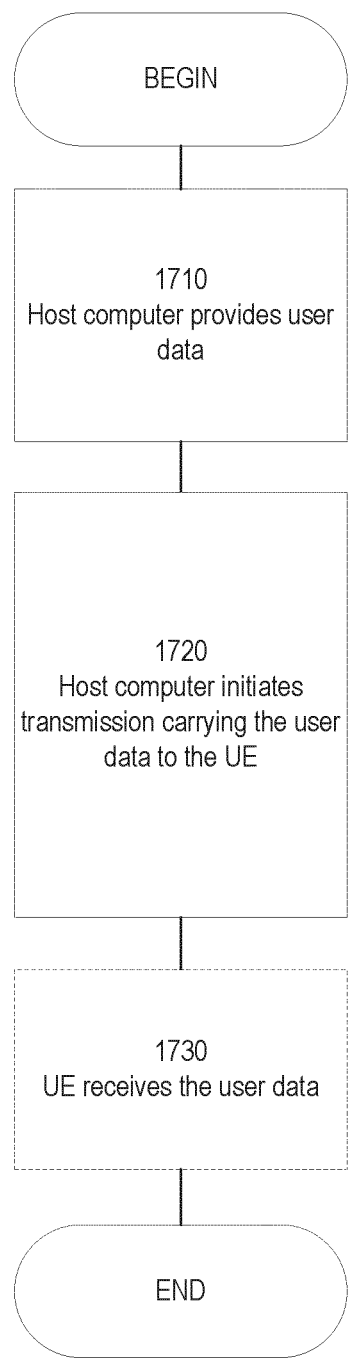

FIG. 16 is a flowchart illustrating a method implemented in a communication system, in accordance with one embodiment. The communication system includes a host computer, an access node and a UE which may be those described with reference to FIGS. 13 and 14. For simplicity of the present disclosure, only drawing references to FIG. 16 will be included in this section. In step 1710 of the method, the host computer provides user data. In an optional substep (not shown) the host computer provides the user data by executing a host application. In step 1720, the host computer initiates a transmission carrying the user data to the UE. The transmission may pass via the access node, in accordance with the teachings of the embodiments described throughout this disclosure. In step 1730 (which may be optional), the UE receives the user data carried in the transmission.

Figure 17:
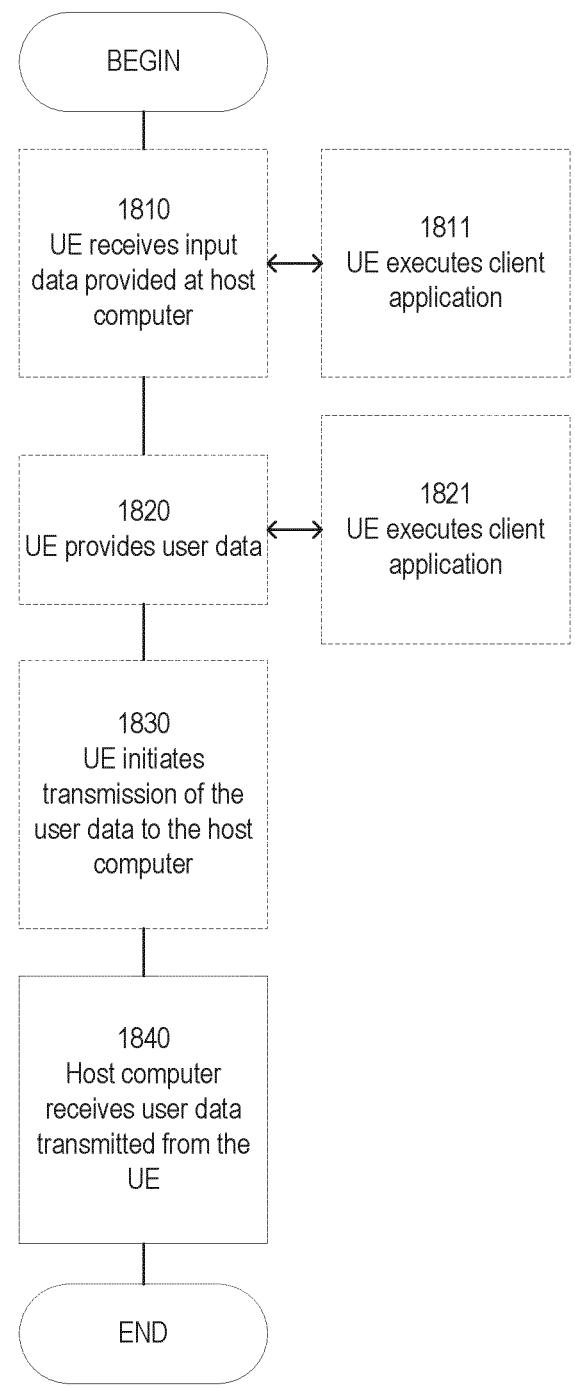

FIG. 17 is a flowchart illustrating a method implemented in a communication system, in accordance with one embodiment. The communication system includes a host computer, an access node and a UE which may be those described with reference to FIGS. 13 and 14. For simplicity of the present disclosure, only drawing references to FIG. 17 will be included in this section. In step 1810 (which may be optional), the UE receives input data provided by the host computer. Additionally or alternatively, in step 1820, the UE provides user data. In substep 1821 (which may be optional) of step 1820, the UE provides the user data by executing a client application. In substep 1811 (which may be optional) of step 1810, the UE executes a client application which provides the user data in reaction to the received input data provided by the host computer. In providing the user data, the executed client application may further consider user input received from the user. Regardless of the specific manner in which the user data was provided, the UE initiates, in substep 1830 (which may be optional), transmission of the user data to the host computer. In step 1840 of the method, the host computer receives the user data transmitted from the UE, in accordance with the teachings of the embodiments described throughout this disclosure.

Figure 18:
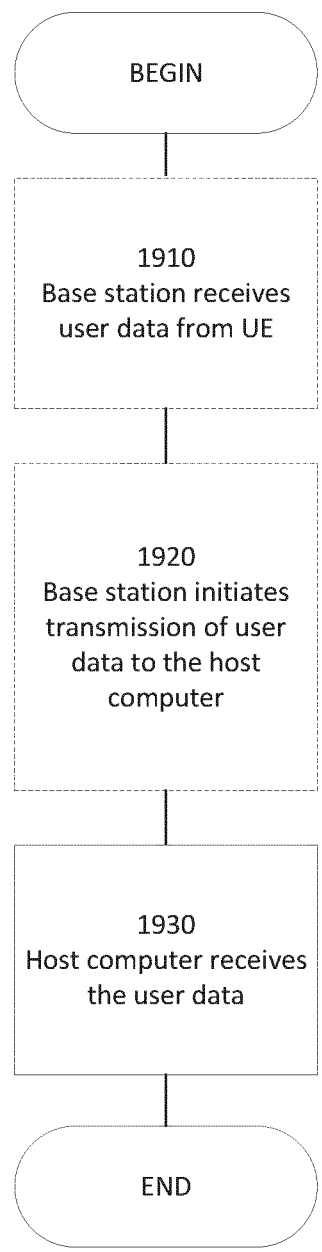

FIG. 18 is a flowchart illustrating a method implemented in a communication system, in accordance with one embodiment. The communication system includes a host computer, an access node and a UE which may be those described with reference to FIGS. 13 and 14. For simplicity of the present disclosure, only drawing references to FIG. 18 will be included in this section. In step 1910 (which may be optional), in accordance with the teachings of the embodiments described throughout this disclosure, the access node receives user data from the UE. In step 1920 (which may be optional), the access node initiates transmission of the received user data to the host computer. In step 1930 (which may be optional), the host computer receives the user data carried in the transmission initiated by the access node.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

The invention claimed is:

1. A method of control channel monitoring implemented by a wireless device, the method comprising:
   receiving downlink control information (DCI) from an access node, the downlink control information including an indication to suspend control channel monitoring for a suspension interval;
   determining a delay; and
   following a delay period indicated by the delay and in response to the indication, suspending control channel monitoring for the suspension interval, wherein the delay period comprises a time period following completion of an ongoing process.

2. The method of claim 1, wherein the suspension interval comprises one or more control channel monitoring occasions.

3. The method of claim 1, wherein determining a delay comprises receiving the delay from the access node.

4. The method of claim 3 wherein the delay is received in the downlink control information.

5. The method of claim 3 wherein the delay is received in radio resource control (RRC) signaling or in a medium access control (MAC) control element (MAC CE).

6. The method of claim 1, wherein determining a delay comprises determining the delay based on one or more configurations including one or more delay parameters for determining the delay.

7. The method of claim 6, wherein the delay parameters of the one or more configurations are preconfigured based on an applicable standard.

8. The method of claim 6, wherein the delay parameters of the monitoring configuration are received from the access node.

9. The method of claim 6, wherein the one or more configurations comprise a monitoring configuration sent from the access node to the wireless device.

10. The method of claim 1, wherein the delay period comprises a time period following completion of a retransmission process.

11. The method of claim 1, wherein the delay period comprises a time period following completion of a scheduled measurement and reporting process.

12. The method of claim 1, wherein the delay period comprises a time period following completion of a scheduled transmission.

13. The method of claim 1, wherein the delay period is defined by one of:
   a number of time slots;
   a number of symbols;
   a number of subframes;
   a specified duration of time; or
   a number of control channel monitoring occasions.

14. The method of claim 1, wherein the delay comprises the number of slots of the currently applied minimum scheduling offset.

15. The method of claim 1, wherein the indication to suspend control channel monitoring applies to monitoring occasions associated with a specific bandwidth part and wherein the wireless device skips one or more monitoring occasions configured for the specific bandwidth part occurring during the suspension interval.

16. The method of claim 15, wherein the delay D depends on the numerology of the bandwidth part (BWP).

17. A method of control channel monitoring implemented by a wireless device, the method comprising:
   receiving downlink control information (DCI) from an access node, the downlink control information including an indication to suspend control channel monitoring for a suspension interval;
   determining a delay; and
   following a delay period indicated by the delay and in response to the indication, continuing control channel monitoring for a control channel with an on-going HARQ process and suspending control channel monitoring for the suspension interval in one or more other downlink control channels.

18. A method of control channel monitoring implemented by a wireless device, the method comprising:
receiving downlink control information (DCI) from an access node, the downlink control information including an indication to suspend control channel monitoring for a suspension interval;
determining a delay; and
following a delay period indicated by the delay and in response to the indication, suspending control channel monitoring for the suspension interval, wherein the indication to suspend control channel monitoring applies to monitoring occasions associated with a specific bandwidth part and wherein the wireless device skips one or more monitoring occasions configured for the specific bandwidth part occurring during the suspension interval, and continuing monitoring a downlink control channel in one or more other bandwidth parts during the suspension interval.

19. The method of claim 18 wherein, when the wireless device switches from the specified bandwidth part to a different bandwidth part during the suspension interval, the wireless device skips one or more monitoring occasions configured for the different bandwidth part occurring during the suspension interval.

\* \* \* \* \*